(12) United States Patent
Li et al.

(10) Patent No.: US 11,960,059 B2
(45) Date of Patent: Apr. 16, 2024

(54) OPTICAL IMAGING SYSTEM

(71) Applicant: Zhejiang Sunny Optical Co., Ltd, Ningbo (CN)

(72) Inventors: Ming Li, Ningbo (CN); Saifeng Lyu, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 694 days.

(21) Appl. No.: 16/844,579

(22) Filed: Apr. 9, 2020

(65) Prior Publication Data
US 2020/0233185 A1    Jul. 23, 2020

Related U.S. Application Data

(63) Continuation of application No. PCT/CN2019/070033, filed on Jan. 2, 2019.

(30) Foreign Application Priority Data

May 3, 2018    (CN) .......................... 201810415825.8

(51) Int. Cl.
*G02B 13/00*    (2006.01)
*G02B 9/34*    (2006.01)
(Continued)

(52) U.S. Cl.
CPC .......... *G02B 13/0045* (2013.01); *G02B 9/34* (2013.01); *G02B 9/60* (2013.01); *G02B 9/62* (2013.01); *G02B 9/64* (2013.01); *G02B 13/004* (2013.01)

(58) Field of Classification Search
CPC ...... G02B 13/0045; G02B 13/04; G02B 9/60; G02B 9/62; G02B 9/64
See application file for complete search history.

(56) References Cited

U.S. PATENT DOCUMENTS

| 2008/0049335 A1 | 2/2008 | Tomioka |
| 2009/0009884 A1 | 1/2009 | Ohtake et al. |

(Continued)

FOREIGN PATENT DOCUMENTS

| CN | 1924630 A | 3/2007 |
| CN | 101295070 A | 10/2008 |

(Continued)

OTHER PUBLICATIONS

International Seach Report for PCT/CN2019/070033 dated Mar. 27, 2019 (PCT/ISA/210).

(Continued)

*Primary Examiner* — Ephrem Z Mebrahtu
(74) *Attorney, Agent, or Firm* — Sughrue Mion, PLLC

(57) ABSTRACT

The disclosure discloses an optical imaging system including a first lens, a second lens, a third lens, and a plurality of subsequent lenses with refractive power and disposed sequentially along an optical axis from an object side to an image side, wherein a lens adjacent to an object side of a lens closest to an imaging plane has a positive refractive power, wherein the lens closest to the imaging plane has a negative refractive power, and an object side surface and an image side surface of the lens closest to an imaging plane are aspheric, and wherein a combined focal length f23 of the second lens and the third lens and an effective focal length fn of the lens closest to the imaging plane satisfy: $-1.5 < f23/fn < 5$.

16 Claims, 11 Drawing Sheets

(51) Int. Cl.
*G02B 9/60* (2006.01)
*G02B 9/62* (2006.01)
*G02B 9/64* (2006.01)

(56) References Cited

U.S. PATENT DOCUMENTS

| | | | |
|---|---|---|---|
| 2012/0033124 A1 | 2/2012 | Tsai | |
| 2013/0003169 A1 | 1/2013 | Lee | |
| 2016/0065813 A1 | 3/2016 | Jo | |
| 2016/0231532 A1 | 8/2016 | Huang et al. | |
| 2016/0377831 A1* | 12/2016 | Liu | G02B 13/0045 |
| | | | 359/714 |
| 2017/0235107 A1* | 8/2017 | Lai | G02B 13/0045 |
| | | | 359/714 |
| 2017/0293114 A1 | 10/2017 | Chen | |
| 2018/0045952 A1 | 2/2018 | Chae et al. | |
| 2018/0335608 A1* | 11/2018 | Chang | G02B 9/64 |
| 2018/0335610 A1* | 11/2018 | Chen | G02B 27/0025 |
| 2019/0086642 A1* | 3/2019 | Chen | G02B 9/62 |
| 2019/0113714 A1* | 4/2019 | Hsueh | G02B 13/0045 |
| 2019/0204553 A1* | 7/2019 | Lian | G02B 13/0045 |
| 2019/0204556 A1* | 7/2019 | Jhang | G02B 3/04 |
| 2019/0243093 A1 | 8/2019 | Wenren et al. | |

FOREIGN PATENT DOCUMENTS

| | | |
|---|---|---|
| CN | 101339290 A | 1/2009 |
| CN | 201716460 U | 1/2011 |
| CN | 102472883 A | 5/2012 |
| CN | 103076668 A | 5/2013 |
| CN | 103955047 A | 7/2014 |
| CN | 104635324 A | 5/2015 |
| CN | 103257430 B | 6/2015 |
| CN | 104730682 A | 6/2015 |
| CN | 104834075 A | 8/2015 |
| CN | 105259641 A | 1/2016 |
| CN | 105319687 A | 2/2016 |
| CN | 205067846 U | 3/2016 |
| CN | 105511063 A | 4/2016 |
| CN | 205281004 U | 6/2016 |
| CN | 106338815 A | 1/2017 |
| CN | 106526798 A | 3/2017 |
| CN | 107092077 A | 8/2017 |
| CN | 107092082 A | 8/2017 |
| CN | 107121761 A | 9/2017 |
| CN | 107179599 A | 9/2017 |
| CN | 107462976 A | 12/2017 |
| CN | 107643582 A | 1/2018 |
| CN | 107728289 A | 2/2018 |
| CN | 207020382 U | 2/2018 |
| CN | 107765404 A | 3/2018 |
| CN | 207148397 U | 3/2018 |
| CN | 207164342 U | 3/2018 |
| CN | 107957619 A | 4/2018 |
| CN | 107957620 A | 4/2018 |
| CN | 207264011 U | 4/2018 |
| CN | 108572432 A | 9/2018 |
| CN | 208297806 U | 12/2018 |
| EP | 3 171 211 A1 | 5/2017 |
| JP | 8-160299 A | 6/1996 |
| JP | 2000-221390 A | 8/2000 |
| JP | 2010-175652 A | 8/2010 |
| JP | 2013-41061 A | 2/2013 |
| JP | 2015-102850 A | 6/2015 |
| JP | 2018-13754 A | 1/2018 |
| KR | 10-2016-0107436 A | 9/2016 |
| KR | 10-2016-0117998 A | 10/2016 |
| TW | 201307890 A1 | 2/2013 |

OTHER PUBLICATIONS

Communication dated Jun. 9, 2021, from the China National Intellectual Property Administration in application No. 202010182213.6.

Communication dated Jun. 9, 2021 from the Chinese Patent Office in Chinese Application No. 202010182213.6.

Ji-yan Zhang et al., "Design of Compact and Light Thin Mobile Phone Lens", Optics & Optoelectronic Technology, 2013, vol. 11, No. 10, pp. 79-82 (4 pages total).

Communication dated Sep. 23, 2021 from the Chinese Patent Office in Chinese Application No. 202010182213.6.

Hang-xing Huang et al., "Thin aspheric lens for mobile phone", Journal of Applied Optics, 2010, vol. 31, No. 3, pp. 365-369 (5 pages total).

Communication dated Jul. 5, 2021 from the Chinese Patent Office in Chinese Application No. 202010181731.6.

* cited by examiner

OPTICAL IMAGING SYSTEM

CROSS-REFERENCE TO RELATED APPLICATIONS

The present patent application is a continuation of International Application No. PCT/CN2019/070033, filed on Jan. 2, 2019, which claims priority to Chinese Patent Application No. 201810415825.8, filed in the China National Intellectual Property Administration (CNIPA) on May 3, 2018. Both of the aforementioned patent applications are hereby incorporated by reference in their entireties.

TECHNICAL FIELD

The disclosure relates to an optical imaging system, and more specifically to an optical imaging system consisting of at least four lenses with refractive power.

BACKGROUND

With the ultra-thinning and miniaturization of electronic products such as mobile phones and tablet computers, the requirements to image quality captured by the included camera are also increased. However, the degree of freedom of the lens design is limited by the small size of the product, and it is difficult to meet the requirements to imaging performance with high resolutions.

The production cost and assembly cost may be reduced and good image quality may be realized with an appropriate design even under limited degree of freedom of lens design.

Therefore, the disclosure proposes the design of the optical imaging system with medium Abbe number, which can achieve good imaging quality and manufacturability.

SUMMARY

The technical solutions provided in the disclosure address at least parts of the technical problems described above.

According to one aspect of the disclosure, an optical imaging system is provided. The optical imaging system may include a first lens, a second lens, a third lens, and a plurality of subsequent lenses with refractive power and disposed sequentially along an optical axis from an object side to an image side, wherein a lens adjacent to an object side of a lens closest to an imaging plane has a positive refractive power, wherein the lens closest to the imaging plane has a negative refractive power, and an object side surface and an image side surface of the lens closest to the imaging plane are aspheric, and wherein a combined focal length f23 of the second lens and the third lens and an effective focal length fn of the lens closest to the imaging plane satisfy: $-1.5 < f23/fn < 5$.

In an embodiment, the formula $-1 \leq R_{n-1}/f < 50$ may be satisfied, where f is an effective focal length of the optical imaging system, and $R_{n-1}$ is a curvature radius of an object-side surface of the lens adjacent to the object side of the lens closest to the imaging plane.

In an embodiment, an Abbe number Vn of the lens closest to the imaging plane may satisfy: $36 \leq Vn \leq 46$.

In an embodiment, the formula $1.5 \leq |Vn/(f1/fn)|/10 \leq 5.5$ may be satisfied, where Vn is an Abbe number of the lens closest to the imaging plane, fn is an effective focal length of the lens closest to the imaging plane, and f1 is an effective focal length of the first lens.

In an embodiment, a half diagonal length ImgH of an effective pixel region on the imaging plane of the optical imaging system and an effective half-aperture $DT_{n1}$ of the object-side surface of the lens closest to the imaging plane may satisfy: $1 < ImgH/DT_{n1} < 1.6$.

In an embodiment, the formula $-2.5 < f_{n-1}/R_{n-1} < 1.5$ may be satisfied, where $f_{n-1}$ is an effective focal length of the lens adjacent to the object side of the lens closest to the imaging plane, and $R_{n-1}$ is a curvature radius of an object-side surface of the lens adjacent to the object side of the lens closest to the imaging plane.

In an embodiment, a curvature radius R1 of an object-side surface of the first lens and a curvature radius R4 of an image-side surface of the second lens may satisfy: $-5.5 < (R1+R4)/(R1-R4) < 2.5$.

In an embodiment, the formula $1 < \Sigma CT/\Sigma AT < 3.5$ may be satisfied, where $\Sigma CT$ is a sum of central thicknesses on the optical axis of all lenses having refractive power, and $\Sigma AT$ is a sum of space intervals on the optical axis between any two adjacent lenses having refractive power among the first lens to the lens closest to the imaging plane.

In an embodiment, a distance SAG11 on the optical axis from an intersection of an object-side surface of the first lens and the optical axis to a vertex of an effective radius of the object-side surface of the first lens and a central thickness CT1 of the first lens may satisfy: $0 < SAG11/CT1 < 0.7$.

In an embodiment, an incidence angle θn of an edge light of a maximum field of view at the image-side surface of the lens closest to the imaging plane may satisfy: $4° < θn < 12°$.

In an embodiment, an effective focal length f of the optical imaging system and an effective focal length f2 of the second lens may satisfy: $-3 < f2/f < 1.5$.

According to another aspect of the disclosure, there is also provided an optical imaging system including a first lens, a second lens, a third lens, and a plurality of subsequent lenses with refractive power and disposed sequentially along an optical axis from an object side to an image side, wherein a lens adjacent to an object side of a lens closest to an imaging plane has a positive refractive power, wherein the lens closest to the imaging plane has a negative refractive power, and an object-side surface and an image-side surface of the lens closest to the imaging plane are aspheric, and wherein an effective focal length f of the optical imaging system and an effective focal length f2 of the second lens may satisfy: $-3 < f2/f < 1.5$.

According to still another aspect of the disclosure, there is also provided an optical imaging system including a first lens, a second lens, a third lens, and a plurality of subsequent lenses with refractive power and disposed sequentially along an optical axis from an object side to an image side, wherein a lens adjacent to an object side of a lens closest to an imaging plane has a positive refractive power, wherein the lens closest to the imaging plane has a negative refractive power, and an object-side surface and an image-side surface of the lens closest to the imaging plane are aspheric, and wherein a formula $1.5 \leq |Vn/(f1/fn)|/10 \leq 5.5$ may be satisfied, where Vn is an Abbe number of the lens closest to the imaging plane, fn is an effective focal length of the lens closest to the imaging plane, and f1 is an effective focal length of the first lens.

According to still another aspect of the disclosure, there is also provided an optical imaging system including a first lens, a second lens, a third lens, and a plurality of subsequent lenses with refractive power and disposed sequentially along an optical axis from an object side to an image side, wherein a lens adjacent to an object side of a lens closest to an imaging plane has a positive refractive power, wherein the lens closest to the imaging plane has a negative refractive power, and an object-side surface and an image-side surface of the lens closest to an imaging plane are aspheric, and wherein a half diagonal length ImgH of an effective pixel region on the imaging plane of the optical imaging system and an effective half-aperture $DT_{n1}$ of the object-side surface of the lens closest to the imaging plane may satisfy: $1<\text{ImgH}/DT_{n1}<1.6$.

According to still another aspect of the disclosure, there is also provided an optical imaging system including a first lens, a second lens, a third lens, and a plurality of subsequent lenses with refractive power and disposed sequentially along an optical axis from an object side to an image side, wherein a lens adjacent to an object side of a lens closest to an imaging plane has a positive refractive power, wherein the lens closest to the imaging plane has a negative refractive power, and an object-side surface and an image-side surface of the lens closest to the imaging plane are aspheric, and wherein a formula $-2.5<f_{n-1}/R_{n-1}<1.5$ may be satisfied, where $f_{n-1}$ is an effective focal length of the lens adjacent to the object side of the lens closest to the imaging plane, and is a curvature radius of an object-side surface of the lens adjacent to the object side of the lens closest to the imaging plane.

According to still another aspect of the disclosure, there is also provided an optical imaging system including a first lens, a second lens, a third lens, and a plurality of subsequent lenses with refractive power and disposed sequentially along an optical axis from an object side to an image side, wherein a lens adjacent to an object side of a lens closest to an imaging plane has a positive refractive power, wherein the lens closest to the imaging plane has a negative refractive power, and an object-side surface and an image-side surface of the lens closest to the imaging plane are aspheric, and wherein a curvature radius R1 of an object side surface of the first lens and a curvature radius R4 of an image side surface of the second lens may satisfy: $-5.5<(R1+R4)/(R1-R4)<2.5$.

According to still another aspect of the disclosure, there is also provided an optical imaging system including a first lens, a second lens, a third lens, and a plurality of subsequent lenses with refractive power and disposed sequentially along an optical axis from an object side to an image side, wherein a lens adjacent to an object side of a lens closest to an imaging plane has a positive refractive power, wherein the lens closest to the imaging plane has a negative refractive power, and an object-side surface and an image-side surface of the lens closest to the imaging plane are aspheric, and wherein an formula: $1<\Sigma CT/\Sigma AT<3.5$ may be satisfied, where $\Sigma CT$ is a sum of central thicknesses on the optical axis of all lenses having refractive power, and $\Sigma AT$ is a sum of space intervals on the optical axis between any two adjacent lenses having refractive power among the first lens to the lens closest to the imaging plane.

According to still another aspect of the disclosure, there is also provided an optical imaging system including a first lens, a second lens, a third lens, and a plurality of subsequent lenses with refractive power and disposed sequentially along an optical axis from an object side to an image side, wherein a lens adjacent to an object side of a lens closest to an imaging plane has a positive refractive power, wherein the lens closest to the imaging plane has a negative refractive power, and an object side surface and an image side surface of the lens closest to the imaging plane are aspheric, and wherein a distance SAG11 on the optical axis from an intersection of an object-side surface of the first lens and the optical axis to a vertex of an effective radius of the object-side surface of the first lens and a central thickness CT1 of the first lens may satisfy: $0<\text{SAG11}/CT1<0.7$.

According to still another aspect of the disclosure, there is also provided an optical imaging system including a first lens, a second lens, a third lens, and a plurality of subsequent lenses with refractive power and disposed sequentially along an optical axis from an object side to an image side, wherein a lens adjacent to an object side of a lens closest to an imaging plane has a positive refractive power, wherein the lens closest to the imaging plane has a negative refractive power, and an object-side surface and an image-side surface of the lens closest to an imaging plane are aspheric, and wherein an incidence angle $\theta n$ of an edge light of a maximum field of view at the image-side surface of the lens closest to the imaging plane may satisfy: $4°<\theta n<12°$.

According to still another aspect of the disclosure, there is also provided an optical imaging system including a first lens, a second lens, a third lens, and a plurality of subsequent lenses with refractive power and disposed sequentially along an optical axis from an object side to an image side, wherein a lens adjacent to an object side of a lens closest to an imaging plane has a positive refractive power, wherein the lens closest to the imaging plane has a negative refractive power, and an object-side surface and an image-side surface of the lens closest to the imaging plane are aspheric, and wherein an Abbe number Vn of the lens closest to the imaging plane may satisfy: $36 \leq Vn \leq 46$.

The optical imaging system the above configuration can achieve at least one of advantageous such as miniaturization, high imaging quality, balance aberration, low sensitivity and so on.

BRIEF INTRODUCTION TO DRAWINGS

The above and other advantages of the embodiments of the disclosure will become apparent from the detailed description with reference to the following drawings, which illustrate exemplary embodiments of the disclosure without exclusive meanings, and in which.

DETAILED DESCRIPTION

Figure 1:
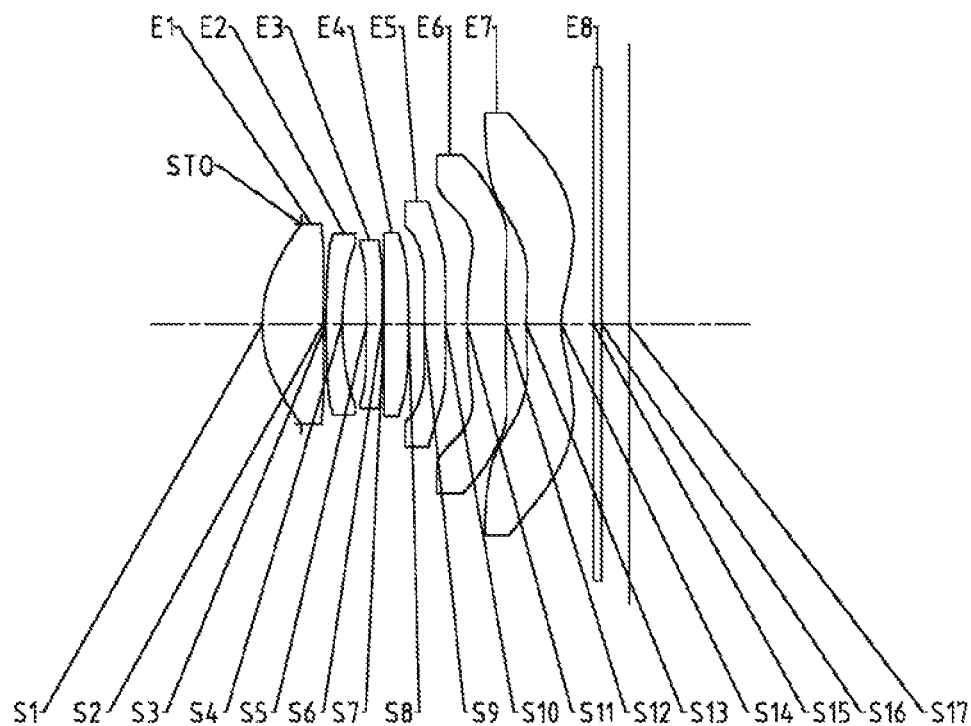
FIG. 1 is a schematic structural diagram of an optical imaging system according to Example 1 of the disclosure.

In order to better understand the disclosure, various aspects of the disclosure will be described in more detail with reference to the accompanying drawings. It should be understood that these details are merely a description of the exemplary embodiments of the disclosure and are not in any way limiting the scope of the disclosure. Throughout the specification, same reference numerals refer to same elements. The expression "and/or" includes any and all combinations of one or more of the associated listed items.

It should be noted that, in the disclosure, the expressions such as first, second are used merely to distinguish one feature from another and do not represent any restriction to the feature. Thus, without departing from the teachings of the disclosure, a first lens discussed below may also be referred to as a second lens.

In the drawings, the thickness, size and shape of the lens have been slightly exaggerated for ease of illustration. Specifically, shapes of spherical surfaces or aspheric surfaces shown in the drawings are shown by way of example. That is, shapes of the spherical surfaces or the aspheric surfaces are not limited to the shapes of the spherical surfaces or the aspheric surfaces shown in the drawings. The drawings are merely illustrated for example and not strictly drawn to scale.

It should also be understood that the terms "include," "including," "having," "comprise," and/or "comprising" when used in this specification indicate the presence of stated features, integrals, steps, operations, elements and/or components, but do not exclude the presence or addition of one or more other features, integrals, steps, operations, elements, components and/or combinations thereof. In addition, expressions, such as "at least one of" when preceding a list of features, modify the entire list of features rather than an individual element in the list. Further, the use of "may," when describing implementations of the disclosure, refers to "one or more implementations of the disclosure." Also, the term "exemplary" is intended to refer to an example or illustration.

As used herein, the terms "substantially," "approximately," etc., are used as approximate representations rather than degree representations, and are used for illustrating inherent deviations in measured or calculated values that will be recognized by those of ordinary skill in the art.

Unless otherwise defined, all terms (including technical and scientific terms) used herein have the same meaning as commonly understood by those of ordinary skill in the art to which the disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly defined as that herein.

In addition, the paraxial area refers to an area near the optical axis. If the surface of the lens is convex and the convex position is not defined, it indicates that the surface of the lens is convex at least in the paraxial area. If the surface of the lens is concave and the concave position is not defined, it indicates that the surface of the lens is concave at least in the paraxial area. In this context, the surface closest to the object in each lens is referred to as the object-side surface, and the surface closest to the imaging plane in each lens is referred to as the image-side surface.

It should be noted that the embodiments of the disclosure and the features of the embodiments may be combined without conflict. The disclosure will be described in detail below with reference to the accompanying drawings and in conjunction with the embodiments.

The disclosure is further described below with reference to specific embodiments.

An optical imaging system according to an exemplary embodiment of the disclosure has, for example, at least four lenses, that is, a first lens, a second lens, a third lens, and a plurality of subsequent lenses. These lenses are arranged along an optical axis sequentially from an object side to an image side.

In an exemplary embodiment, the lens adjacent to an object side of the lens being closest to an imaging plane may have a positive refractive power. The lens closest to the imaging plane may have a negative refractive power, and both an object-side surface and an image-side surface thereof may be aspheric surface. The low-order aberrations of the system can be effectively balanced by controlling the distribution of the positive or negative refractive power of the lenses, so that the optical imaging system can achieve better imaging quality.

In an exemplary embodiment, an effective focal length f of the optical imaging system and an effective focal length f2 of the second lens may satisfy: $-3<f2/f<1.5$, more specifically, may further satisfy $-2.76 \leq f2/f \leq 1.41$. By controlling the effective focal length of the second lens and the effective focal length of the optical imaging system, the refractive power can be distributed appropriately, the aberration can be corrected and the sensitivity of the system can be reduced.

In the exemplary implementation, the following formula: $-1 \leq R_{n-1}/f<50$ may be satisfied, more specifically, $-0.94 \leq R_{n-1}/f \leq 48.05$ may be further satisfied, where f is the effective focal length of the optical imaging system, and $R_{n-1}$ is a curvature radius of an object-side surface of the lens adjacent to the object side of the lens being closest to the imaging plane. The curvature radius of the object-side surface of the lens adjacent to the object side of the lens closest to the imaging plane and the effective focal length of the optical imaging system are optimized, which can effectively control the field of view, astigmatism of the optical system, etc., and balance and lift the near-distance image quality.

In an exemplary embodiment, a combined focal length f23 of the second lens and the third lens and an effective focal length fn of the lens closest to the imaging plane may satisfy: $-1.5<f23/fn<5$, more specifically, may further satisfy $-1.2 \leq f23/fn \leq 4.7$. By distributing the refractive power of the second lens, the third lens and the lens closest to the imaging plane appropriately, the high-level aberration and the high-level astigmatism can be balanced, and the imaging quality of the system can be improved.

In an exemplary embodiment, the Abbe number Vn of the lens closest to the imaging plane may satisfy: 36≤Vn≤46, more specifically, may further satisfy 36≤Vn≤45.5. By using the medium Abbe number material and the aspheric surface to balance the residual chromatic aberration, the lens chromatic aberration can be further reduced.

In the exemplary implementation, the following formula: 1.5≤|Vn/(f1/fn)|/10≤5.5 may be satisfied, more specifically, 1.91≤|Vn/(f1/fn)|/10≤5.45 may be further satisfied, where Vn is an Abbe number of the lens closest to the imaging plane, fn is the effective focal length of the lens closest to the imaging plane, and f1 is an effective focal length of the first lens. By controlling the balance among the Abbe number of the lens closest to the imaging plane, the effective focal length of the lens closest to the imaging plane and the effective focal length of the first lens, the vertical chromatic difference and the astigmatism can be corrected effectively, and the matching of CRA can be adjusted effectively.

In an exemplary embodiment, a half diagonal length ImgH of an effective pixel region on the imaging plane of the optical imaging system and an effective half-aperture $DT_{n1}$ of an object-side surface of the lens closest to the imaging plane may satisfy: 1<ImgH/$DT_{n1}$<1.6, more specifically, may further satisfy 1.33≤ImgH/$DT_{n1}$≤1.54. By reducing the optical effective surface, the lens shape can be miniaturized and the poor lens shaping can be avoided effectively.

In an exemplary embodiment, the following formula: −2.5<$f_{n-1}$/$R_{n-1}$<1.5 may be satisfied, more specifically, −2.23≤$f_{n-1}$/$R_{n-1}$≤1.22 may be further satisfied, where $f_{n-1}$ is an effective focal length of the lens adjacent to the object side of the lens closest to the imaging plane, and $R_{n-1}$ is a curvature radius of an object-side surface of the lens adjacent to the object side of the lens closest to the imaging plane. By appropriately distributing the effective focal length of the lens adjacent to the object side of the lens closest to the imaging plane and the curvature radius of the lens adjacent to the object side of the lens closest to the imaging plane, the matching of the CRA can be effectively controlled, and the high-level coma and the high-level astigmatism can be balanced.

In an exemplary embodiment, a curvature radius R1 of an object-side surface of the first lens and a curvature radius R4 of an image-side surface of the second lens may satisfy −5.5<(R1+R4)/(R1−R4)<2.5, more specifically, may further satisfy −5.19≤(R1+R4)/(R1−R4)≤2.11. By balancing the spherical aberration, the comet aberration can be reduced, the variation of the peripheral slope can be avoided, and the stray light may be restrained.

In an exemplary embodiment, the formula 1<ΣCT/ΣAT<3.5 may be satisfied, more specifically, the formula 1.48≤ΣCT/ΣAT≤3.14 may be further satisfied, where ΣCT is a sum of central thicknesses on the optical axis of all the lenses having refractive power, and ΣAT is a sum of space intervals on the optical axis between any two adjacent lenses having refractive power among the first lens to the lens closest to the imaging plane. By reducing the light deflection angle, the high-level aberration can be reduced, the image quality near the optical axis can be raised, the sensitivity can be reduced, and the lens miniaturization can be maintained.

In an exemplary embodiment, a distance SAG11 on the optical axis from an intersection of an object-side surface of the first lens and the optical axis to a vertex of an effective radius of the object-side surface of the first lens and a central thickness CT1 of the first lens may satisfy: 0<SAG11/CT1<0.7, more specifically, may further satisfy 0.25≤SAG11/CT1≤0.64. By effectively controlling the relationship between distance on the optical axis from the intersection of the object-side surface of the first lens and the optical axis to the vertex of the effective radius of the object-side surface of the first lens and the central thickness of the first lens, the miniaturization can be realized, the peripheral aberrations can be corrected, the imaging quality can be further improved, and the poor lens shaping can be avoided effectively.

Figure 15:
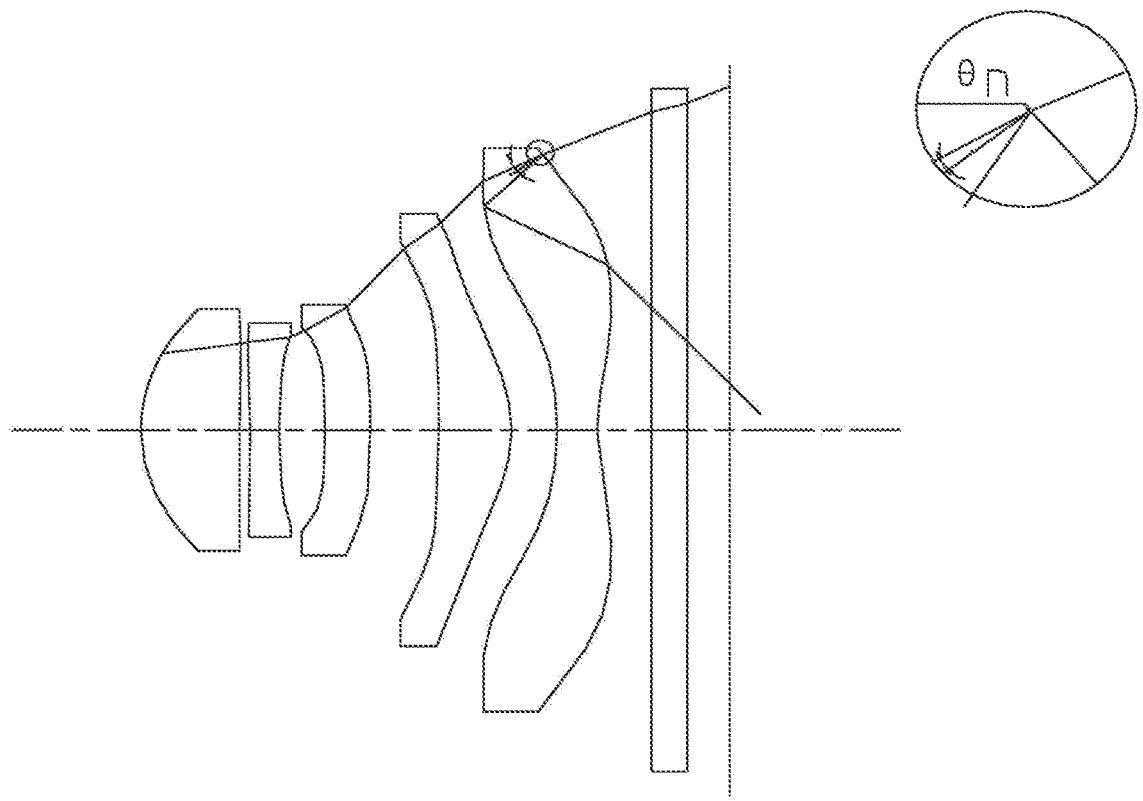
FIG. 15 is a schematic diagram showing an incident angle of an edge light of a maximum field of view at an image-side surface of the lens being closest to an imaging plane.

In an exemplary embodiment, an incidence angle θn of an edge light of a maximum field-of-view at an image-side surface of the lens closest to the imaging plane may satisfy: 4°<θn<12° (as shown in FIG. 15), more specifically, may further satisfy 4.8°≤θn≤11.6°. By effectively controlling the incidence angle of the edge light of the maximum field of view at an image-side surface of the lens closest to the imaging plane, the variation of the peripheral slope can be effectively avoided, the reflected energy caused by the uneven film plating can be reduced, and the stray light can be avoided.

In an exemplary embodiment, the optical imaging system may also be provided with an aperture STO for limiting the beam, adjusting the amount of light input, and improving the imaging quality.

The optical imaging system according to the above embodiments of the disclosure may include at least four lenses, such as four, five, six, and seven lenses described herein. The lens miniaturization can be ensured and the imaging quality can be improved by appropriately distributing the refractive power, surface shape, and central thickness of each lens, the distance between the lenses and the like, so that the optical imaging system is easy for processing and can be applied to portable electronic products.

According to the embodiment of the disclosure, at least one of the surfaces of each lens is an aspheric surface. The aspheric lens is characterized by a continuous change in curvature from the center to the periphery thereof. Unlike a spherical lens having a constant curvature from the center to the periphery thereof, an aspheric lens has a better performance in curvature radius, and has the advantages of improved distorted aberration and astigmatic aberration, and is capable to make the field of view larger and more realistic. With the aspheric lens, the aberrations that occur during imaging may be eliminated as much as possible, thereby improving the image quality. In addition, the adoption to the aspheric lenses may reduce the number of lenses used in the optical system.

However, the one skilled in the art will understand that the numbers of lenses constituting the lens assembly can be changed to obtain the various results and advantages described in the disclosure without departing from the technical solutions to be protected herein. For example, the optical imaging system may also include other numbers of lenses if desired.

Specific examples applicable to the optical imaging system of the above embodiments will be further described below with reference to the accompanying drawings.

Example 1

The optical imaging system according to Example 1 of the disclosure is described below with reference to FIGS. 1 to 2D.

FIG. 1 shows a schematic structural diagram of an optical imaging system according to Example 1 of the disclosure. As shown in FIG. 1, the optical imaging system includes seven lenses E1-E7 sequentially arranged from an object side to an imaging side along an optical axis. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10. The sixth lens E6 has an object-side surface S11 and an image-side surface S12. The seventh lens E7 has an object-side surface S13 and an image-side surface S14.

In this example, the first lens E1 has a positive refractive power. The second lens E2 has a negative refractive power. The third lens E3 has a negative refractive power. The fourth lens E4 has a positive refractive power. The fifth lens E5 has a positive refractive power. The sixth lens E6 has a positive refractive power. The seventh lens E7 has a negative refractive power.

In the optical imaging system of the example, an aperture STO is further provided between the object side and the first lens E1 for limiting the beam. The optical imaging system according to Example 1 may include a filter E8 having an object-side surface S15 and an image-side surface S16, which may be used for correcting a color deviation. The light from the object passes through the surfaces 51 to S16 in sequence and is finally imaged on the imaging plane S17.

Table 1 shows the surface type, curvature radius, thickness, material, and conical coefficient of each lens of the optical imaging system of Example 1.

TABLE 1

| Surface No. | Surface Type | Curvature Radius | Thickness | Material Refractive Index | Abbe Number | Conical Coefficient |
|---|---|---|---|---|---|---|
| OBJ | Spherical | Infinite | Infinite | | | |
| STO | Spherical | Infinite | −0.5392 | | | |
| S1 | Aspheric | 1.8148 | 0.8568 | 1.55 | 56.1 | −1.9296 |
| S2 | Aspheric | 10.8007 | 0.0383 | | | −3.9060 |
| S3 | Aspheric | 6.1313 | 0.2300 | 1.69 | 19.4 | −2.6684 |
| S4 | Aspheric | 3.4408 | 0.3416 | | | −1.1784 |
| S5 | Aspheric | 200.0000 | 0.2200 | 1.65 | 23.5 | |
| S6 | Aspheric | 56.6495 | 0.0301 | | | −0.4172 |
| S7 | Aspheric | 64.2486 | 0.3486 | 1.55 | 56.1 | 0.0000 |
| S8 | Aspheric | −26.8513 | 0.2146 | | | −0.0176 |
| S9 | Aspheric | 15.9248 | 0.3000 | 1.65 | 23.5 | −3.0000 |
| S10 | Aspheric | 18.3307 | 0.3019 | | | −0.0150 |
| S11 | Aspheric | 9.3919 | 0.5600 | 1.55 | 56.1 | −11.9998 |
| S12 | Aspheric | −7.3993 | 0.2871 | | | −4.2663 |
| S13 | Aspheric | 3.3117 | 0.4896 | 1.56 | 45.5 | −11.9786 |
| S14 | Aspheric | 1.2605 | 0.4569 | | | −6.1576 |
| S15 | Spherical | Infinite | 0.1156 | 1.52 | 64.2 | |
| S16 | Spherical | Infinite | 0.3889 | | | |
| S17 | Spherical | Infinite | | | | |

In this example, seven lenses are used as an example to ensure the miniaturization of the lens by appropriately distributing the focal length and the surface shape of each lens and selecting suitable materials. At the same time, various aberrations are corrected to improve the resolution and imaging quality of the lens. Each aspheric surface type x is defined by the following formula:

$$x = \frac{ch^2}{1 + \sqrt{1 - (k+1)c^2h^2}} + \sum A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the curvature radius R in the above Table 1); k is the conic coefficient (shown in the above Table 1); Ai is a correction coefficient for the i-th order of the aspheric surface. Table 2 below shows high-order coefficients $A_4, A_6, A_8, A_{10}, A_{12}, A_{14}, A_{16}, A_{18}$ and $A_{20}$ applicable to each aspheric surface S1-S14 in Example 1.

TABLE 2

| Surface No. | A4 | A6 | A8 | A10 | A12 |
|---|---|---|---|---|---|
| S1 | 3.3325E−02 | 3.3034E−02 | −1.1925E−01 | 2.5544E−01 | −3.3702E−01 |
| S2 | −1.3323E−01 | 2.6425E−01 | −4.1320E−01 | 5.6259E−01 | −6.2861E−01 |
| S3 | −1.5022E−01 | 2.8124E−01 | −4.2108E−01 | 6.4598E−01 | −8.4160E−01 |
| S4 | −3.6836E−02 | 3.5495E−02 | 1.3017E−01 | −6.6091E−01 | 1.5421E+00 |
| S5 | −8.3385E−03 | −5.4020E−02 | −2.1359E−01 | 9.6018E−01 | −2.2356E+00 |
| S6 | 1.6660E−01 | −8.7488E−01 | 2.6969E+00 | −6.1212E+00 | 9.0740E+00 |
| S7 | 1.8179E−01 | −1.0056E+00 | 3.1682E+00 | −6.7303E+00 | 9.0882E+00 |
| S8 | 5.9263E−03 | −2.9251E−01 | 7.9586E−01 | −1.3849E+00 | 1.6192E+00 |
| S9 | −6.4089E−06 | −2.5029E−01 | 2.6311E−01 | 1.0905E−01 | −5.5114E−01 |
| S10 | 7.0747E−02 | −4.3919E−01 | 6.5135E−01 | −5.8149E−01 | 3.3488E−01 |
| S11 | 2.2060E−01 | −4.0137E−01 | 4.1415E−01 | −3.4978E−01 | 2.1389E−01 |
| S12 | 1.5497E−01 | −4.2596E−02 | −9.1471E−02 | 9.4819E−02 | −4.6259E−02 |
| S13 | −3.0073E−01 | 2.6264E−01 | −1.9357E−01 | 9.3598E−02 | −2.7550E−02 |
| S14 | −1.4724E−01 | 9.6757E−02 | −5.1123E−02 | 1.7036E−02 | −3.4057E−03 |

| Surface No. | A14 | A16 | A18 | A20 |
|---|---|---|---|---|
| S1 | 2.7429E−01 | −1.3395E−01 | 3.5638E−02 | −3.9794E−03 |
| S2 | 4.9222E−01 | −2.4228E−01 | 6.6527E−02 | −7.7474E−03 |
| S3 | 7.5567E−01 | −4.1242E−01 | 1.2270E−01 | −1.5211E−02 |
| S4 | −2.0827E+00 | 1.6412E+00 | −6.8978E−01 | 1.1936E−01 |
| S5 | 3.1208E+00 | −2.5975E+00 | 1.2068E+00 | −2.4235E−01 |
| S6 | −8.6083E+00 | 5.0936E+00 | −1.7065E+00 | 2.4473E−01 |

TABLE 2-continued

| | | | | |
|---|---|---|---|---|
| S7 | −7.6919E+00 | 3.9684E+00 | −1.1366E+00 | 1.3772E−01 |
| S8 | −1.3125E+00 | 7.2562E−01 | −2.5119E−01 | 4.1476E−02 |
| S9 | 5.6689E−01 | −2.7232E−01 | 5.8270E−02 | −3.3450E−03 |
| S10 | −1.2360E−01 | 2.8593E−02 | −3.8560E−03 | 2.3549E−04 |
| S11 | −8.7848E−02 | 2.2514E−02 | −3.1953E−03 | 1.8982E−04 |
| S12 | 1.3292E−02 | −2.2612E−03 | 2.0930E−04 | −8.0945E−06 |
| S13 | 4.9626E−03 | −5.3792E−04 | 3.2343E−05 | −8.3112E−07 |
| S14 | 3.9449E−04 | −2.4029E−05 | 5.5139E−07 | 3.6632E−09 |

Table 3 listed below shows the effective focal lengths f1 to f7 of the lenses of Example 1, the effective focal length f of the optical imaging system, the distance TTL between the object side surface S1 of the first lens E1 and the imaging plane S17 of the optical imaging system on the optical axis (that is, the total optical length of the optical imaging system), and the half diagonal length ImgH of the effective pixel region on the electronic photosensitive element of the optical imaging system.

TABLE 3

| | | | |
|---|---|---|---|
| f1 (mm) | 3.87 | f7 (mm) | −3.97 |
| f2 (mm) | −11.99 | f (mm) | 4.34 |
| f3 (mm) | −122.69 | TTL (mm) | 5.18 |
| f4 (mm) | 34.74 | ImgH (mm) | 3.70 |
| f5 (mm) | 179.46 | | |
| f6 (mm) | 7.67 | | |

With reference to Table 1 and Table 3 above, the following characters are met in this example:

The effective focal length f of the optical imaging system and the effective focal length f2 of the second lens E2 satisfy f2/f=−2.76;

The combined focal length f23 of the second lens E2 and the third lens E3 and the effective focal length f7 of the seventh lens E7 closest to the imaging plane satisfy f23/f7=2.75;

The Abbe number V7 of the seventh lens E7 closest to the imaging plane satisfies V7=43;

The half diagonal length ImgH of the effective pixel area on the imaging plane S17 of the optical imaging system and the effective half-diameter $DT_{71}$ of the object side surface S14 of the seventh lens E7 closest to the imaging plane S17 of the optical imaging system satisfy ImgH/$DT_{71}$=1.39;

The curvature radius R1 of the object side surface S1 of the first lens E1 and the curvature radius R4 of the image side surface S4 of the second lens E2 satisfy (R1+R4)/(R1−R4)=−3.23;

The distance SAG11 on the optical axis from an intersection of an object side surface S1 of the first lens E1 and the optical axis to a vertex of an effective radius of the object side surface S1 of the first lens E1 and a central thickness CT1 of the first lens E1 satisfies SAG11/CT1=0.64;

The incidence angle θ7 of the edge light of the maximum field of view at the image-side surface S14 of the seventh lens E7 closest to the imaging plane satisfies: θ7=11.6';

|V7/(f1/f7)|/10=4.68, where V7 is the Abbe number of the seventh lens E7 closest to the imaging plane, f7 is the effective focal length of the seventh lens E7 closest to the imaging plane, and f1 is the effective focal length of the first lens E1;

$R_{7-1}$/f=0.76, where f is the effective focal length of the optical imaging system, and $R_{7-1}$ is the curvature radius of the object-side surface S11 of the sixth lens E6 adjacent to the object side of the seventh lens E7 closest to the imaging plane;

$f_{7-1}$/$R_{7-1}$=0.82, where $f_{7-1}$ is the effective radius of the sixth lens E6 adjacent to the object side of the seventh lens E7 closest to the imaging plane, and $R_{7-1}$ is the curvature radius of the object side surface S11 of the sixth lens E6 adjacent to the object side of the seventh lens E7 closest to the imaging plane; and ΣCT/ΣAT=2.48, wherein ΣCT is the sum of central thicknesses on the optical axis of all the lenses having refractive power, and ΣAT is the sum of space intervals on the optical axis between any two adjacent lenses having refractive power among the first lens E1 to the seventh lens E7 closest to the imaging plane.

Figure 2A:
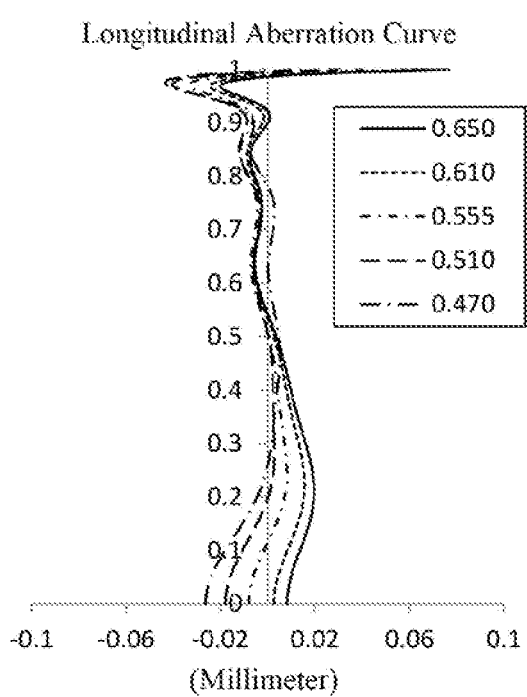
FIGS. 2A to 2D illustrate a longitudinal aberration curve, an astigmatism curve, a distortion curve and a lateral color curve of the optical imaging system of Example 1, respectively.
Figure 2B:
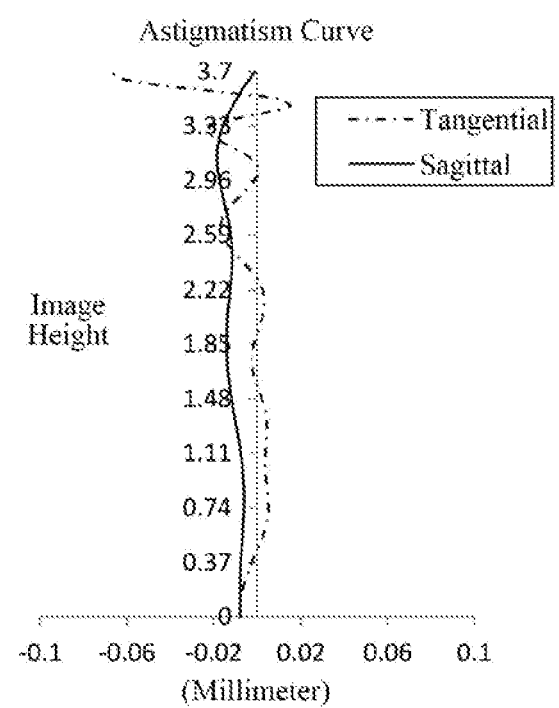
Figure 2C:
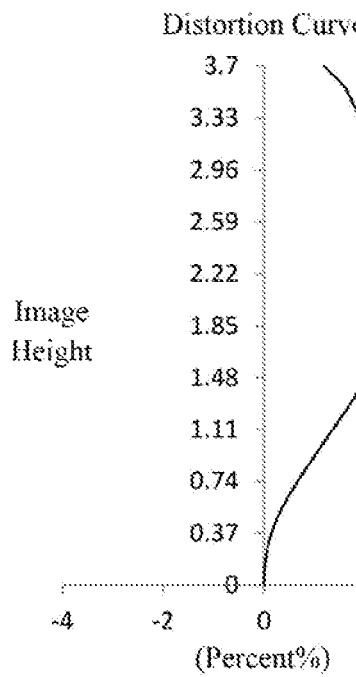
Figure 2D:
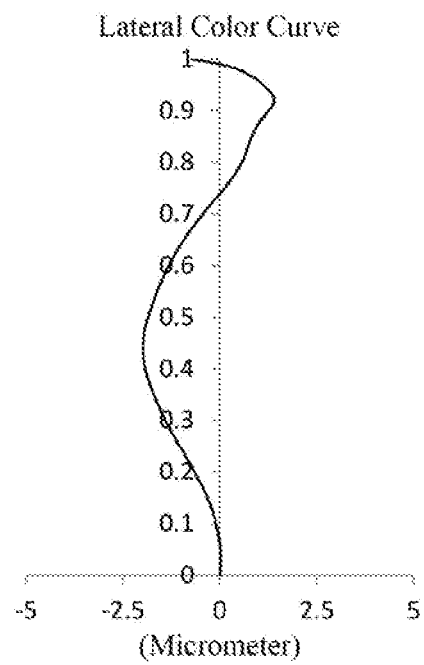

FIG. 2A illustrates a longitudinal aberration curve of the optical imaging system according to Example 1, representing deviations of focal points converged by light of different wavelengths after passing through the optical imaging system. FIG. 2B illustrates an astigmatism curve of the optical imaging system according to Example 1, representing a curvature of a tangential plane and a curvature of a sagittal plane. FIG. 2C illustrates a distortion curve of the optical imaging system according to Example 1, representing amounts of distortion corresponding to different FOVs. FIG. 2D illustrates a lateral color curve of the optical imaging system according to Example 1, representing deviations of different image heights on an image plane after light passes through the optical imaging system. It can be seen from FIG. 2A to FIG. 2D that the optical imaging system provided in Example 1 may achieve a good image quality.

Example 2

The optical imaging system according to Example 2 of the disclosure is described below with reference to FIGS. 3 to 4D. The optical imaging system described in this Example 2 and the following examples has the same structure as the optical imaging system described in Example 1, except for the parameters of the lenses of the optical imaging system, for example, the curvature radius, thickness, cone coefficient, and effective focal length of each lens, the space interval on the axis between lenses, the high order term coefficient of each lens, and the like. For brevity, some descriptions similar to those of Example 1 will be omitted.

Figure 3:
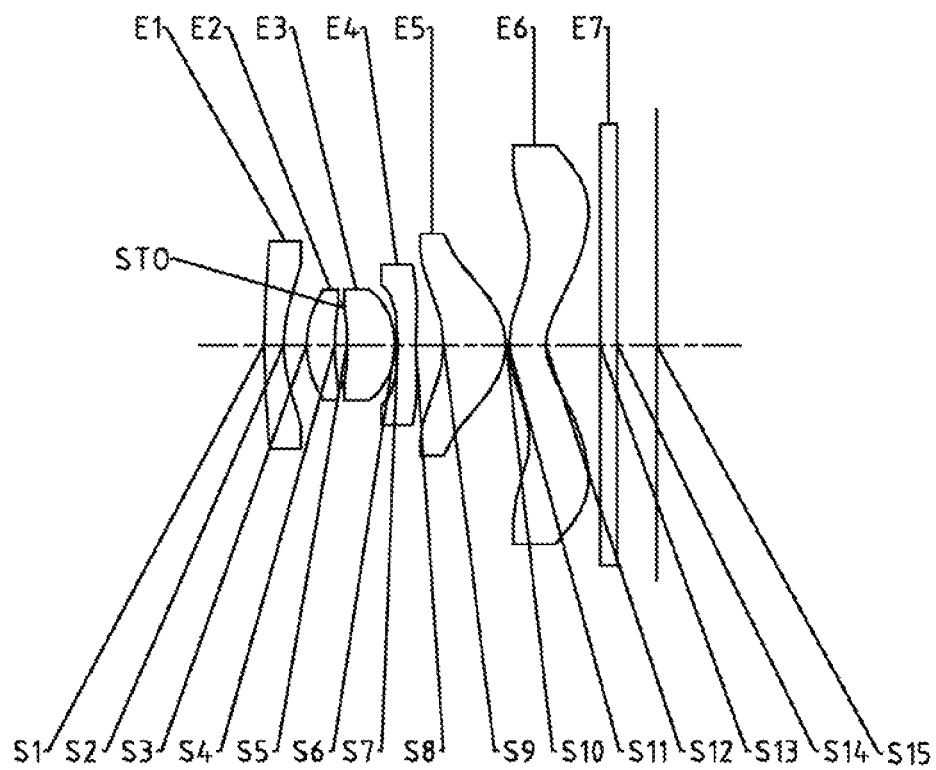
FIG. 3 is a schematic structural diagram of an optical imaging system according to Example 2 of the disclosure.

FIG. 3 shows a schematic structural diagram of an optical imaging system according to Example 2 of the disclosure. As shown in FIG. 3, the optical imaging system according to Example 2 includes six lenses E1-E6 having an object side surface and an image side surface, respectively. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10. The sixth lens E6 has an object-side surface S11 and an image-side surface S12.

In this example, the first lens E1 has a negative refractive power. The second lens E2 has a positive refractive power. The third lens E3 has a positive refractive power. The fourth lens E4 has a negative refractive power. The fifth lens E5 has a positive refractive power. The sixth lens E6 has a negative refractive power.

In the optical imaging system of this example, an aperture STO is further provided between the second lens E2 and the third lens E3 for limiting the beam. The optical imaging system according to Example 1 may include a filter E7 having an object side surface S13 and an image side surface S14 that may be used for correcting a color deviation. The light from the object passes through the surfaces S1 to S14 in sequence and is finally imaged on the imaging plane S15.

Table 4 below shows the surface type, curvature radius, thickness, material, and conical coefficient of each lens of the optical imaging system of Example 2. Table 5 shows the high-order coefficients applicable to each aspheric surface in Example 2. Table 6 shows the effective focal lengths f1 to f6 of the lenses of Example 2, the effective focal length f of the optical imaging system, the distance TTL between the object side surface S1 of the first lens E1 and the imaging plane S15 of the optical imaging system on the optical axis, and the half diagonal length ImgH of the effective pixel region on the electronic photosensitive element of the optical imaging system. Each aspheric surface type may be defined by formula (1) given in Example 1 above.

TABLE 4

| Surface No. | Surface Type | Curvature Radius | Thickness | Material Refractive Index | Abbe Number | Conical Coefficient |
|---|---|---|---|---|---|---|
| OBJ | Spherical | Infinite | Infinite | | | |
| S1 | Aspheric | 11.9953 | 0.2400 | 1.53 | 55.8 | 50.0000 |
| S2 | Aspheric | 1.9263 | 0.2813 | | | −8.4494 |
| S3 | Aspheric | 1.2785 | 0.3451 | 1.56 | 41.8 | 0.2801 |
| S4 | Aspheric | 4.2824 | 0.0907 | | | 1.3439 |
| STO | Spherical | Infinite | 0.0588 | | | |
| S5 | Aspheric | −7.4600 | 0.5912 | 1.55 | 56.1 | −1.1636 |
| S6 | Aspheric | −1.0589 | 0.0300 | | | −1.9642 |
| S7 | Aspheric | −6.0777 | 0.2210 | 1.67 | 20.4 | 42.8873 |
| S8 | Aspheric | 4.2464 | 0.3447 | | | −0.1225 |
| S9 | Aspheric | −1.1996 | 0.7694 | 1.55 | 56.1 | −4.6295 |
| S10 | Aspheric | −0.8082 | 0.0300 | | | −1.8709 |
| S11 | Aspheric | 1.0882 | 0.4547 | 1.55 | 44.5 | −2.2269 |
| S12 | Aspheric | 0.6749 | 0.6661 | | | −3.3375 |
| S13 | Spherical | Infinite | 0.2100 | 1.52 | 64.2 | |
| S14 | Spherical | Infinite | 0.4816 | | | |
| S15 | Spherical | Infinite | | | | |

TABLE 5

| Surface No. | A4 | A6 | A8 | A10 | A12 |
|---|---|---|---|---|---|
| S1 | 4.0985E−02 | −8.5050E−02 | 6.3686E−02 | −2.7834E−02 | 7.6291E−03 |
| S2 | 1.3791E−01 | −2.8143E−01 | 1.7192E−01 | 6.2380E−02 | −1.3480E−01 |
| S3 | −7.2862E−02 | 2.1828E−01 | −1.8761E+00 | 7.9153E+00 | −1.8042E+01 |
| S4 | 1.0785E−01 | −8.3729E−01 | 8.9297E+00 | −5.5639E+01 | 2.1203E+02 |
| S5 | −1.4586E−01 | −1.0708E−01 | 2.4929E−01 | −1.7710E+01 | 1.0438E+02 |
| S6 | −2.5366E−01 | 6.8935E+00 | −6.9504E+00 | 3.2100E+01 | −8.9020E+01 |
| S7 | −4.7971E−01 | 1.7340E+00 | −9.7005E+00 | 3.3405E+01 | −6.8727E+01 |
| S8 | −3.5939E−01 | 7.7764E−01 | −2.0651E+00 | 3.8785E+00 | −4.6805E+00 |
| S9 | 9.4431E−02 | −6.5698E−01 | 2.1304E+00 | −3.2431E+00 | 2.6490E+00 |
| S10 | 2.5534E−02 | −4.8264E−01 | 1.1129E+00 | −1.5567E+00 | 1.4490E+00 |
| S11 | −2.1257E−01 | 9.5714E−02 | −2.6657E−02 | −1.1196E−03 | 3.4205E−03 |
| S12 | −5.9761E−02 | −1.3780E−02 | 3.2785E−02 | −2.1475E−02 | 7.7683E−03 |

| Surface No. | A14 | A16 | A18 | A20 | A22 |
|---|---|---|---|---|---|
| S1 | −1.2799E−03 | 1.1798E−04 | −4.5047E−06 | 0.0000E+00 | 0.0000E+00 |
| S2 | 6.9921E−02 | −1.5968E−02 | 1.3902E−03 | 0.0000E+00 | 0.0000E+00 |
| S3 | 2.4086E+01 | −1.5920E+01 | 0.0000E+00 | 0.0000E+00 | 0.0000E+00 |
| S4 | −4.6901E+02 | 4.2947E+02 | 0.0000E+00 | 0.0000E+00 | 0.0000E+00 |
| S5 | −2.6775E+02 | 1.5181E+02 | 0.0000E+00 | 0.0000E+00 | 0.0000E+00 |
| S6 | 1.3034E+02 | −8.2837E+01 | 0.0000E+00 | 0.0000E+00 | 0.0000E+00 |
| S7 | 7.6280E+01 | −3.5410E+01 | 0.0000E+00 | 0.0000E+00 | 0.0000E+00 |
| S8 | 3.1587E+00 | −8.6644E−01 | 0.0000E+00 | 0.0000E+00 | 0.0000E+00 |
| S9 | −1.1823E+00 | 2.6966E−01 | −2.4332E−02 | 0.0000E+00 | 0.0000E+00 |
| S10 | −7.8740E−01 | 2.2050E−01 | −2.4511E−02 | 0.0000E+00 | 0.0000E+00 |
| S11 | −9.9081E−04 | 1.2006E−04 | −5.4698E−06 | 0.0000E+00 | 0.0000E+00 |
| S12 | −1.6968E−03 | 2.2069E−04 | −1.5632E−05 | 0.0000E+00 | 4.6199E−07 |

TABLE 6

| f1 (mm) | −4.31 | f (mm) | 2.22 |
|---|---|---|---|
| f2 (mm) | 3.13 | TTL (mm) | 4.81 |
| f3 (mm) | 2.19 | ImgH (mm) | 3.03 |
| f4 (mm) | −3.72 | | |
| f5 (mm) | 2.68 | | |
| f6 (mm) | −5.28 | | |

Figure 4A:
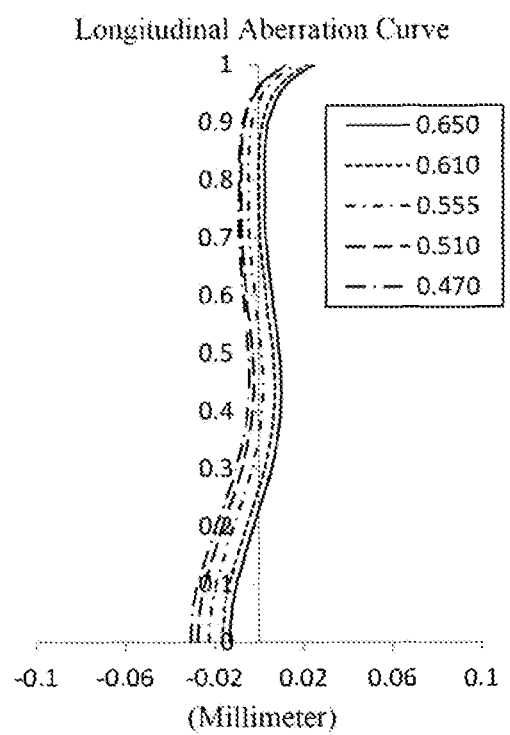
FIGS. 4A to 4D illustrate a longitudinal aberration curve, an astigmatism curve, a distortion curve and a lateral color curve of the optical imaging system of Example 2, respectively.
Figure 4B:
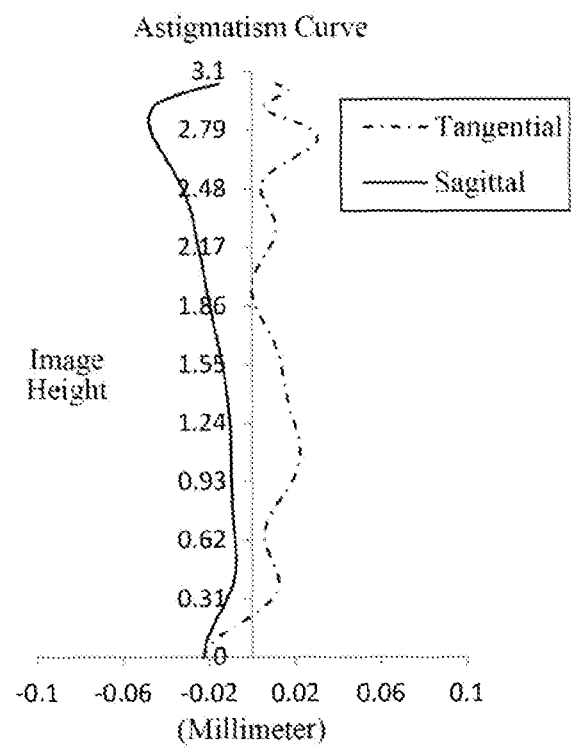
Figure 4C:
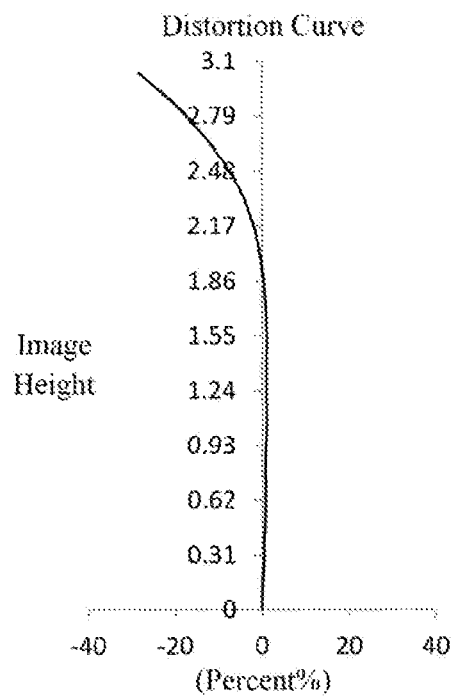
Figure 4D:
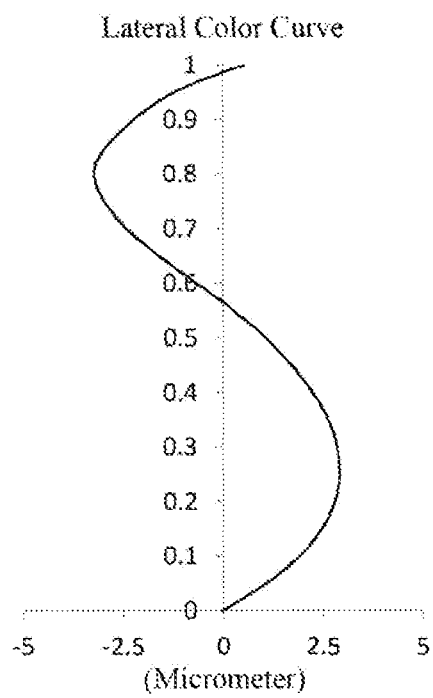

FIG. 4A illustrates a longitudinal aberration curve of the optical imaging system according to Example 2, representing deviations of focal points converged by light of different wavelengths after passing through the optical imaging system. FIG. 4B illustrates an astigmatism curve of the optical imaging system according to Example 2, representing a curvature of a tangential plane and a curvature of a sagittal plane. FIG. 4C illustrates a distortion curve of the optical imaging system according to Example 2, representing amounts of distortion corresponding to different FOVs. FIG. 4D illustrates a lateral color curve of the optical imaging system according to Example 2, representing deviations of different image heights on an image plane after light passes through the optical imaging system. It can be seen from FIG. 4A to FIG. 4D that the optical imaging system provided in Example 2 may achieve a good image quality.

Example 3

The optical imaging system according to Example 3 of the disclosure is described below with reference to FIGS. 5 to 6D.

Figure 5:
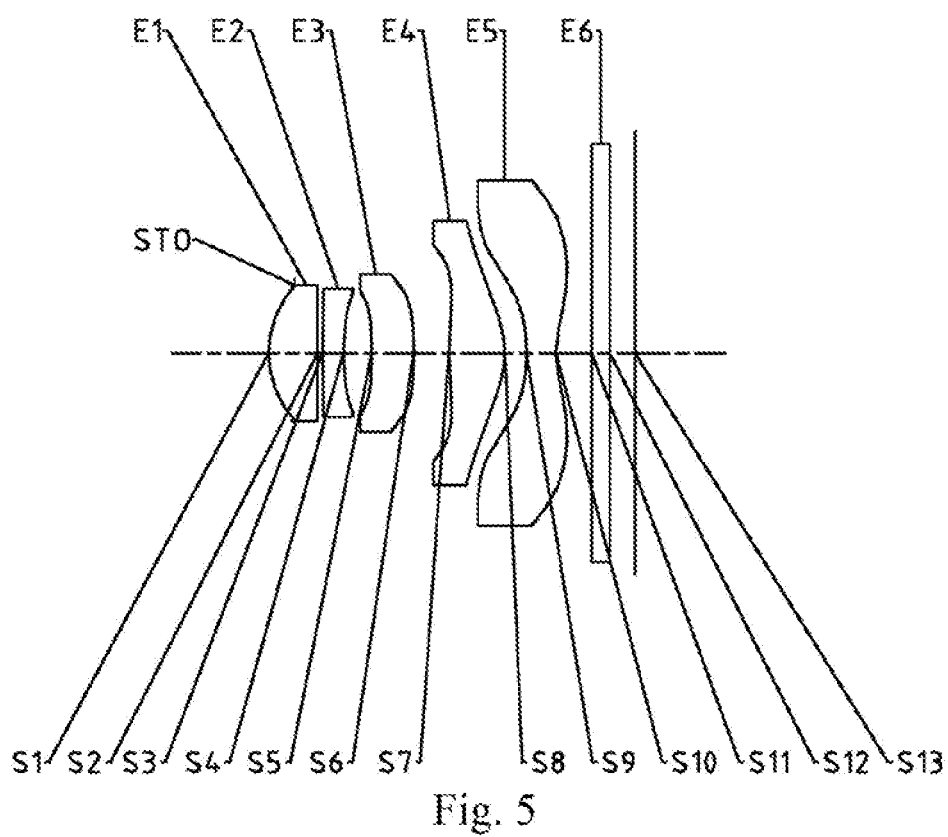
FIG. 5 is a schematic structural diagram of an optical imaging system according to Example 3 of the disclosure.

FIG. 5 shows a schematic structural diagram of an optical imaging system according to Example 3 of the disclosure. As shown in FIG. 5, the optical imaging system according to Example 3 includes five lenses E1-E5 having an object side surface and an image side surface, respectively. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10.

In this example, the first lens E1 has a positive refractive power. The second lens E2 has a negative refractive power. The third lens E3 has a positive refractive power. The fourth lens E4 has a positive refractive power. The fifth lens E5 has a negative refractive power.

In the optical imaging system of the example, an aperture STO is further provided between the object side and the first lens E1 for limiting the beam. The optical imaging system according to Example 3 may include a filter E6 having an object side surface S11 and an image side surface S12 that may be used for correcting a color deviation. The light from the object passes through the surfaces S1 to S12 in sequence and is finally imaged on the imaging plane S13.

The following Table 7 shows the surface type, curvature radius, thickness, material, and conical coefficient of each lens of the optical imaging system of Example 3. Table 8 shows the high-order coefficients applicable to each aspheric surface in Example 3. Table 9 shows the effective focal lengths f1 to f5 of the lenses of Example 3, the effective focal length f of the optical imaging system, the distance TTL between the object side surface S1 of the first lens E1 and the imaging plane S13 of the optical imaging system on the optical axis, and the half diagonal length ImgH of the effective pixel region on the electronic photosensitive element of the optical imaging system. Each aspheric surface type may be defined by formula (1) given in Example 1 above.

TABLE 7

| Surface No. | Surface Type | Curvature Radius | Thickness | Material Refractive Index | Abbe Number | Conical Coefficient |
|---|---|---|---|---|---|---|
| OBJ | Spherical | Infinite | Infinite | | | |
| STO | Spherical | Infinite | −0.2944 | | | |
| S1 | Aspheric | 1.4082 | 0.5652 | 1.55 | 56.1 | −1.0186 |
| S2 | Aspheric | 9.0585 | 0.0537 | | | −13.0000 |
| S3 | Aspheric | 10.2103 | 0.2420 | 1.67 | 20.4 | −10.3788 |
| S4 | Aspheric | 3.0844 | 0.3265 | | | −4.9256 |
| S5 | Aspheric | −16.5544 | 0.4843 | 1.53 | 55.8 | 0.0000 |
| S6 | Aspheric | −11.2906 | 0.4116 | | | −9.5449 |
| S7 | Aspheric | 7.7012 | 0.6448 | 1.55 | 56.1 | 0.0000 |
| S8 | Aspheric | −1.3207 | 0.2505 | | | −9.1914 |
| S9 | Aspheric | −3.2838 | 0.3400 | 1.57 | 36 | −1.7572 |
| S10 | Aspheric | 1.3657 | 0.4124 | | | −9.8056 |
| S11 | Spherical | Infinite | 0.2100 | 1.52 | 64.2 | |
| S12 | Spherical | Infinite | 0.2891 | | | |
| S13 | Spherical | Infinite | | | | |

TABLE 8

| Surface No. | A4 | A6 | A8 | A10 | A12 | A14 | A16 |
|---|---|---|---|---|---|---|---|
| S1 | 5.1566E−02 | 1.4673E−02 | −6.5029E−02 | 4.2156E−01 | −1.0945E+00 | 1.3078E+00 | −6.2619E−01 |
| S2 | −2.1089E−01 | 4.9427E−01 | −3.6864E−01 | −1.0530E+00 | 3.2824E+00 | −3.8551E+00 | 1.5968E+00 |
| S3 | −2.6572E−01 | 6.4232E−01 | 1.9202E−02 | −3.1939E+00 | 7.6235E+00 | −7.9527E+00 | 3.1197E+00 |
| S4 | −1.0261E−01 | 5.2598E−01 | −1.1788E+00 | 3.1901E+00 | −6.7419E+00 | 8.2526E+00 | −4.0086E+00 |
| S5 | −2.4680E−01 | −7.9032E−02 | 6.2577E−01 | −3.0240E+00 | 6.5838E+00 | −7.6867E+00 | 3.9880E+00 |
| S6 | −2.1478E−01 | −1.2928E−02 | −1.4057E−01 | −2.7840E−01 | 1.2481E−01 | −1.7252E−01 | 1.0281E−01 |
| S7 | −5.8109E−03 | −1.0065E−01 | 1.2926E−01 | −1.6472E−01 | 1.1209E−01 | −3.5401E−02 | 4.0459E−03 |
| S8 | −1.0388E−01 | 1.7424E−01 | −1.9435E−01 | 1.3988E−01 | −5.6196E−02 | 1.1527E−02 | −9.5582E−04 |
| S9 | −2.0415E−01 | 4.3518E−02 | 7.7462E−02 | −5.0767E−02 | 1.3294E−02 | −1.6492E−03 | 7.9065E−05 |
| S10 | −1.5100E−01 | 8.8276E−02 | −3.4184E−02 | 8.1690E−03 | −1.1930E−03 | 9.5133E−05 | −2.8875E−06 |

TABLE 9

| | | | |
|---|---|---|---|
| f1 (mm) | 2.97 | f (mm) | 3.44 |
| f2 (mm) | −6.70 | TTL (mm) | 4.23 |
| f3 (mm) | 64.03 | ImgH (mm) | 2.83 |
| f4 (mm) | 2.12 | | |
| f5 (mm) | −1.63 | | |

Figures 6A, 6B:
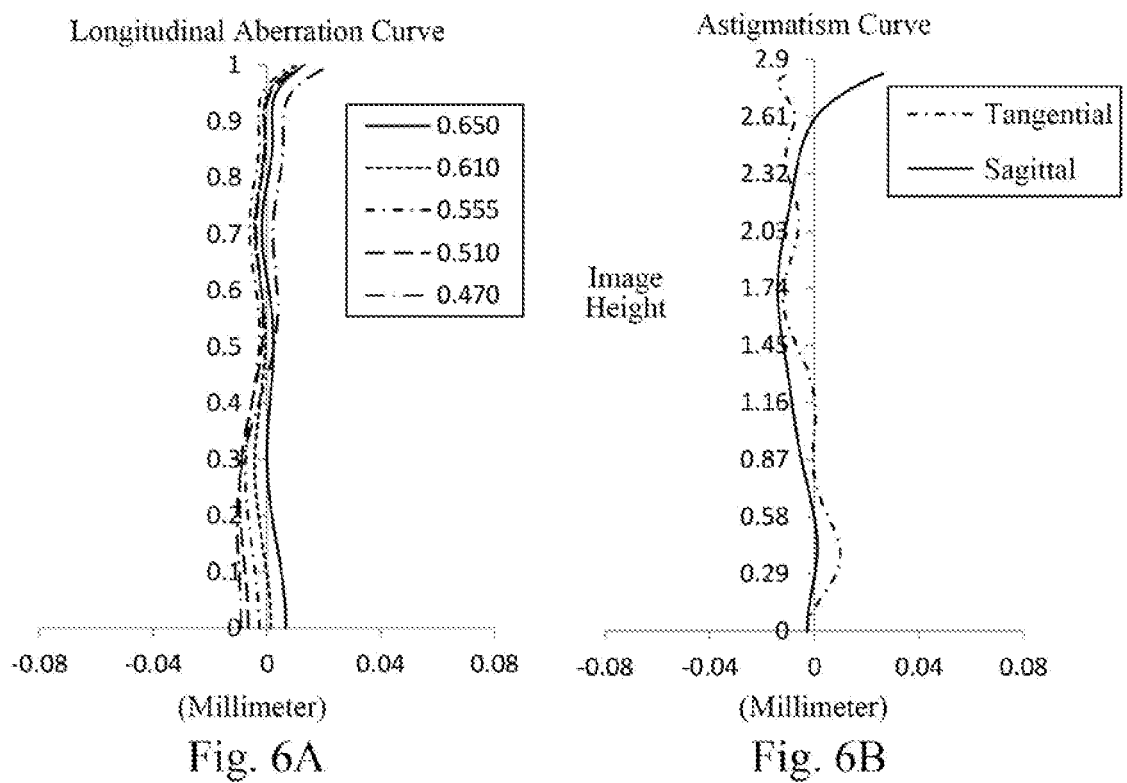
FIGS. 6A to 6D illustrate a longitudinal aberration curve, an astigmatism curve, a distortion curve and a lateral color curve of the optical imaging system of Example 3, respectively.
Figure 6C:
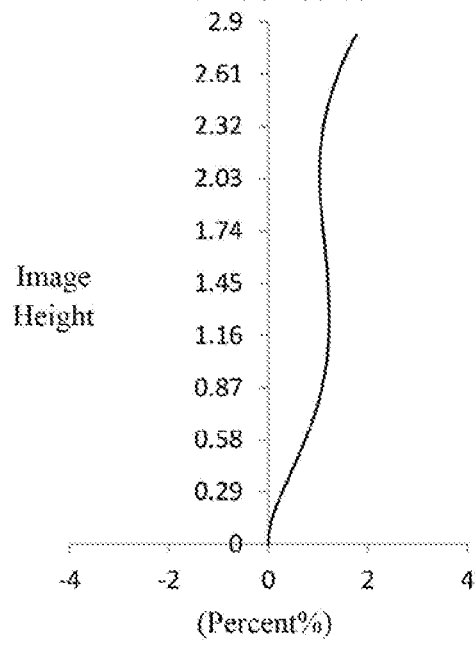
Figure 6D:
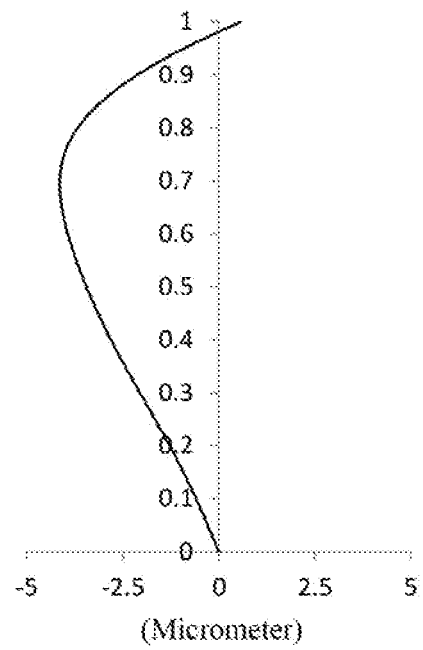

FIG. 6A illustrates a longitudinal aberration curve of the optical imaging system according to Example 3, representing deviations of focal points converged by light of different wavelengths after passing through the optical imaging system. FIG. 6B illustrates an astigmatism curve of the optical imaging system according to Example 3, representing a curvature of a tangential plane and a curvature of a sagittal plane. FIG. 6C illustrates a distortion curve of the optical imaging system according to Example 3, representing amounts of distortion corresponding to different FOVs. FIG. 6D illustrates a lateral color curve of the optical imaging system according to Example 3, representing deviations of different image heights on an image plane after light passes through the optical imaging system. It can be seen from FIG. 6A to FIG. 6D that the optical imaging system provided in Example 3 may achieve a good image quality.

Example 4

The optical imaging system according to Example 4 of the disclosure is described below with reference to FIGS. 7 to 8D.

Figure 7:
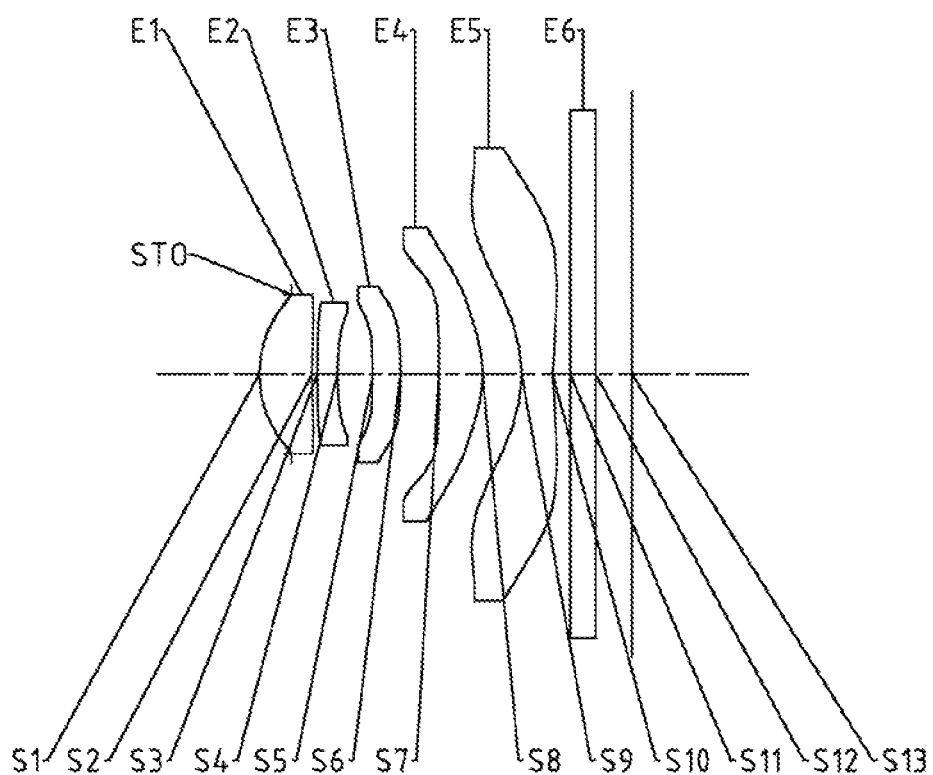
FIG. 7 is a schematic structural diagram of an optical imaging system according to Example 4 of the disclosure.

FIG. 7 shows a schematic structural diagram of an optical imaging system according to Example 4 of the disclosure. As shown in FIG. 7, the optical imaging system according to Example 4 includes five lenses E1-E5 having an object side surface and an image side surface, respectively. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10.

In this example, the first lens E1 has a positive refractive power. The second lens E2 has a negative refractive power. The third lens E3 has a negative refractive power. The fourth lens E4 has a positive refractive power. The fifth lens E5 has a negative refractive power.

In the optical imaging system of the example, an aperture STO is further provided between the object side and the first lens E1 for limiting the beam. The optical imaging system according to Example 4 may include a filter E6 having an object side surface S11 and an image side surface S12 that may be used for correcting a color deviation. The light from the object passes through the surfaces S1 to S12 in sequence and is finally imaged on the imaging plane S13.

The following Table 10 shows the surface type, curvature radius, thickness, material, and conical coefficient of each lens of the optical imaging system of Example 4. Table 11 shows the high-order coefficients applicable to each aspheric surface in Example 4. Table 12 shows the effective focal lengths f1 to f5 of the lenses of Example 4, the effective focal length f of the optical imaging system, the distance TTL between the object side surface S1 of the first lens E1 and the imaging plane S13 of the optical imaging system on the optical axis, and the half diagonal length ImgH of the effective pixel region on the electronic photosensitive element of the optical imaging system. Each aspheric surface type may be defined by formula (1) given in Example 1 above.

TABLE 10

| Surface No. | Surface Type | Curvature Radius | Thickness | Material Refractive Index | Abbe Number | Conical Coefficient |
|---|---|---|---|---|---|---|
| OBJ | Spherical | Infinite | Infinite | | | |
| STO | Spherical | Infinite | −0.3647 | | | |
| S1 | Aspheric | 1.3334 | 0.6176 | 1.55 | 56.1 | −2.1630 |
| S2 | Aspheric | 5.3984 | 0.0648 | | | −12.8304 |
| S3 | Aspheric | 7.8006 | 0.2320 | 1.67 | 20.4 | 0.0000 |
| S4 | Aspheric | 3.2403 | 0.4175 | | | −8.6089 |
| S5 | Aspheric | −8.8282 | 0.3216 | 1.55 | 47.9 | −23.1775 |
| S6 | Aspheric | −14.1710 | 0.4507 | | | −15.7100 |
| S7 | Aspheric | 75.5814 | 0.5175 | 1.55 | 56.1 | −26.3000 |
| S8 | Aspheric | −1.6117 | 0.4567 | | | −0.7381 |
| S9 | Aspheric | −1.7705 | 0.3630 | 1.55 | 42.1 | −6.2951 |
| S10 | Aspheric | 4.2104 | 0.2055 | | | −26.3000 |
| S11 | Spherical | Infinite | 0.3000 | 1.52 | 64.2 | |
| S12 | Spherical | Infinite | 0.4230 | | | |
| S13 | Spherical | Infinite | | | | |

TABLE 11

| Surface No. | A4 | A6 | A8 | A10 | A12 | A14 | A16 |
|---|---|---|---|---|---|---|---|
| S1 | 1.0874E−01 | 6.2222E−02 | −3.1218E−01 | 8.9495E−01 | −1.4347E+00 | 1.2065E+00 | −4.3873E−01 |
| S2 | −1.6459E−01 | 1.1335E−01 | 4.1794E−01 | −1.4499E+00 | 2.0154E+00 | −1.4536E+00 | 4.1486E−01 |
| S3 | −2.0710E−01 | 3.0988E−01 | 4.2942E−01 | −1.8791E+00 | 2.6865E+00 | −1.7534E+00 | 4.2392E−01 |
| S4 | −1.2850E−02 | 2.5623E−01 | 2.4002E−01 | −1.3206E+00 | 2.7926E+00 | −3.0426E+00 | 1.7847E+00 |
| S5 | −2.3993E−01 | −3.2976E−01 | 2.2161E+00 | −8.3135E+00 | 1.6819E+01 | −1.7954E+01 | 8.0656E+00 |
| S6 | −2.3353E−01 | 2.9224E−02 | −8.5734E−02 | 8.9295E−02 | −2.0911E−02 | −5.5478E−02 | 6.7305E−02 |
| S7 | −5.7017E−02 | 3.6496E−02 | −1.0962E−01 | 8.2574E−02 | −5.0085E−02 | 2.2042E−02 | −3.7216E−03 |
| S8 | 9.0372E−02 | −1.0201E−02 | 4.6944E−03 | −3.5802E−02 | 2.8824E−02 | −8.5775E−03 | 8.9736E−04 |
| S9 | −9.7099E−02 | 6.7284E−02 | −2.1344E−02 | 4.4035E−03 | −6.0643E−04 | 5.0043E−05 | −1.8489E−06 |
| S10 | −5.8821E−02 | 2.1739E−02 | −6.2347E−03 | 9.3836E−04 | −7.7001E−05 | 5.3669E−06 | −2.8902E−07 |

TABLE 12

| f1 (mm) | 3.08 | f (mm) | 3.82 |
|---|---|---|---|
| f2 (mm) | −8.48 | TTL (mm) | 4.37 |
| f3 (mm) | −43.69 | ImgH (mm) | 3.34 |
| f4 (mm) | 2.90 | | |
| f5 (mm) | −2.19 | | |

Figure 8A:
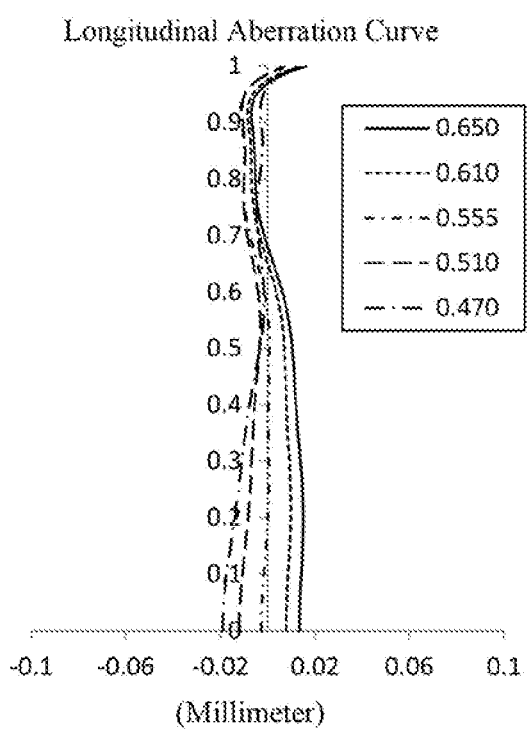
FIGS. 8A to 8D illustrate a longitudinal aberration curve, an astigmatism curve, a distortion curve and a lateral color curve of the optical imaging system of Example 4, respectively.
Figure 8B:
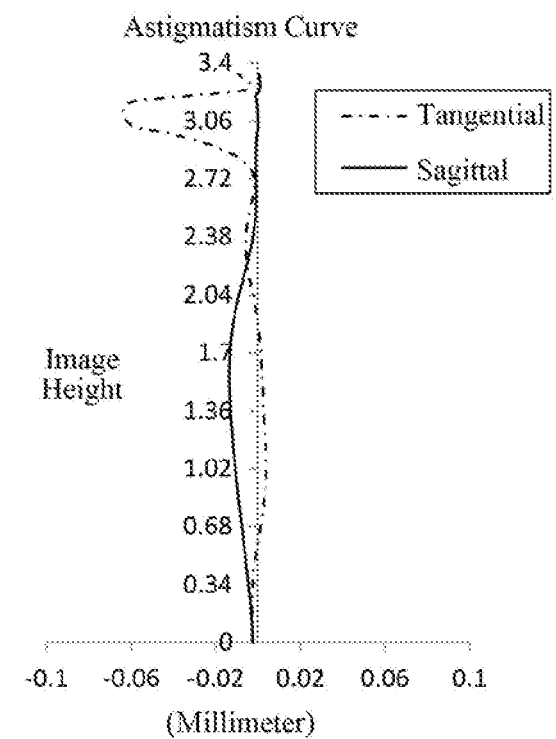
Figure 8C:
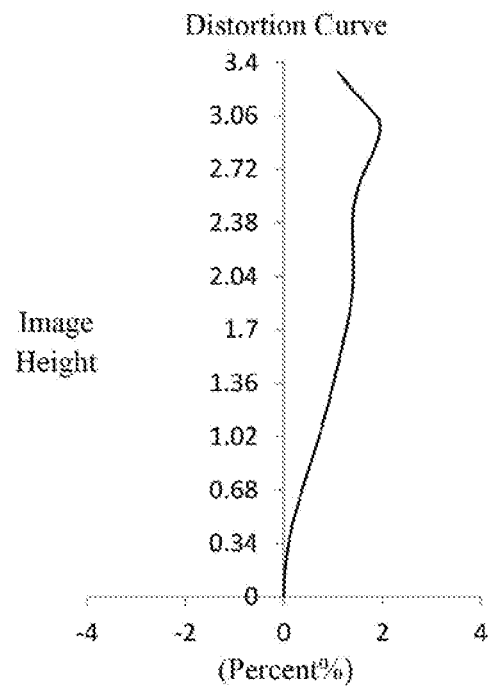
Figure 8D:
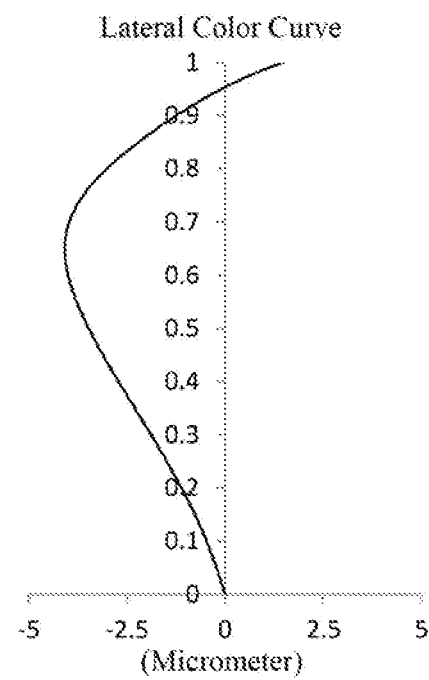

FIG. 8A illustrates a longitudinal aberration curve of the optical imaging system according to Example 4, representing deviations of focal points converged by light of different wavelengths after passing through the optical imaging system. FIG. 8B illustrates an astigmatism curve of the optical imaging system according to Example 4, representing a curvature of a tangential plane and a curvature of a sagittal plane. FIG. 8C illustrates a distortion curve of the optical imaging system according to Example 4, representing amounts of distortion corresponding to different FOVs. FIG. 8D illustrates a lateral color curve of the optical imaging system according to Example 4, representing deviations of different image heights on an image plane after light passes through the optical imaging system. It can be seen from FIG. 8A to FIG. 8D that the optical imaging system provided in Example 4 may achieve a good image quality.

Example 5

The optical imaging system according to Example 5 of the disclosure is described below with reference to FIGS. 9 to 10D.

Figure 9:
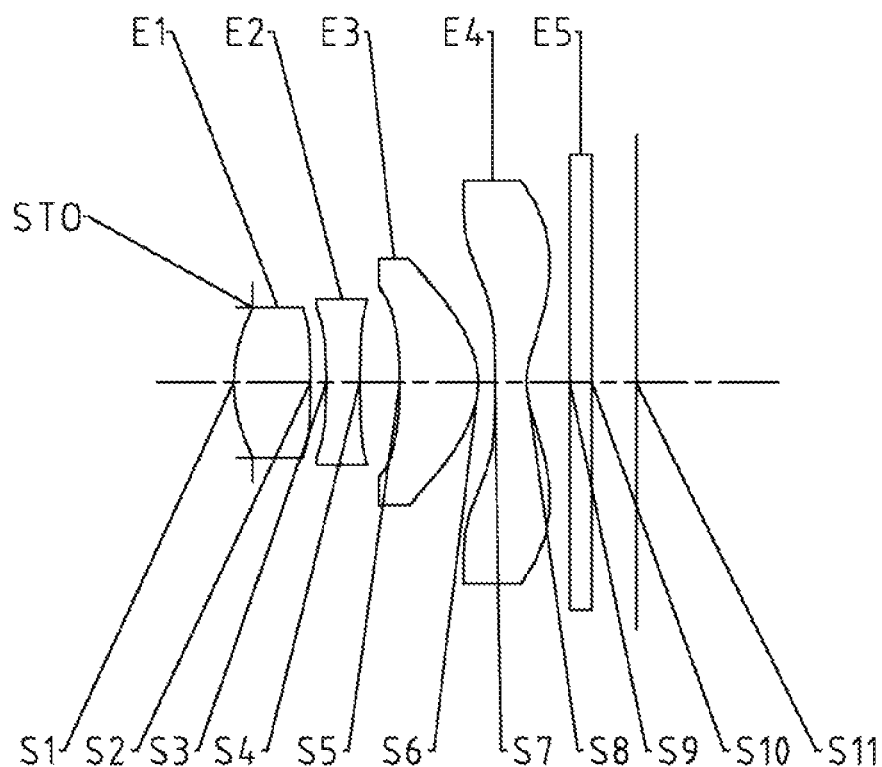
FIG. 9 is a schematic structural diagram of an optical imaging system according to Example 5 of the disclosure.

FIG. 9 shows a schematic structural diagram of an optical imaging system according to Example 5 of the disclosure. As shown in FIG. 9, the optical imaging system according to Example 5 includes four lenses E1-E4 having an object side surface and an image side surface, respectively. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8.

In this example, the first lens E1 has a positive refractive power. The second lens E2 has a negative refractive power. The third lens E3 has a positive refractive power. The fourth lens E4 has a negative refractive power.

In the optical imaging system of the example, an aperture STO is further provided between the object side and the first lens E1 for limiting the beam. The optical imaging system according to Example 5 may include a filter E5 having an object side surface S9 and an image side surface S10 that may be used for correcting a color deviation. The light from the object passes through the surfaces S1 to S10 in sequence and is finally imaged on the imaging plane S11.

The following Table 13 shows the surface type, curvature radius, thickness, material, and conical coefficient of each lens of the optical imaging system of Example 5. Table 14 shows the high-order coefficients applicable to each aspheric surface in Example 5. Table 15 shows the effective focal lengths f1 to f4 of the lenses of Example 5, the effective focal length f of the optical imaging system, the distance TTL between the object side surface S1 of the first lens E1 and the imaging plane S11 of the optical imaging system on the optical axis, and the half diagonal length ImgH of the effective pixel region on the electronic photosensitive element of the optical imaging system. Each aspheric surface type may be defined by formula (1) given in Example 1 above.

TABLE 13

| Surface No. | Surface Type | Curvature Radius | Thickness | Material Refractive Index | Material Abbe Number | Conical Coefficient |
|---|---|---|---|---|---|---|
| OBJ | Spherical | Infinite | Infinite | | | |
| STO | Spherical | Infinite | −0.1606 | | | |
| S1 | Aspheric | 1.4418 | 0.7301 | 1.55 | 56.1 | −18.8168 |
| S2 | Aspheric | −2709.3893 | 0.1544 | | | −50.4026 |
| S3 | Aspheric | −8.7409 | 0.3145 | 1.65 | 23.5 | −2.0565 |
| S4 | Aspheric | 6.5108 | 0.3832 | | | −9.3033 |
| S5 | Aspheric | −4.2250 | 0.7586 | 1.55 | 56.1 | 4.6909 |
| S6 | Aspheric | −0.7080 | 0.1518 | | | −4.5359 |
| S7 | Aspheric | 146.2394 | 0.3000 | 1.56 | 38.8 | 5.9985 |
| S8 | Aspheric | 0.7341 | 0.4146 | | | −5.8170 |
| S9 | Spherical | Infinite | 0.2100 | 1.52 | 64.2 | |
| S10 | Spherical | Infinite | 0.4229 | | | |
| S11 | Spherical | Infinite | | | | |

TABLE 14

| Surface No. | A4 | A6 | A8 | A10 | A12 |
|---|---|---|---|---|---|
| S1 | 7.2866E−01 | −2.4100E+00 | 6.8803E+00 | −1.3556E+01 | 1.5099E+01 |
| S2 | −2.0344E−01 | −1.8575E−01 | 2.2806E−01 | −3.9210E−01 | 8.4204E−01 |
| S3 | −2.5403E−01 | −1.7681E−01 | 4.3399E−01 | 5.1446E−01 | −1.0714E+00 |
| S4 | −3.5039E−02 | 1.9510E−02 | −5.1609E−02 | 9.6597E−01 | −1.4592E+00 |
| S5 | 4.7412E−03 | −8.9438E−02 | −1.1320E−01 | −1.1347E+00 | 5.1729E+00 |
| S6 | −2.6715E−01 | 7.1094E−01 | −2.1289E+00 | 3.7707E+00 | 4.0481E+00 |
| S7 | −1.0627E−01 | −2.4778E−01 | 3.9789E−01 | −2.6203E−01 | 1.0656E−01 |
| S8 | −1.7681E−01 | 1.0511E−01 | −4.5610E−02 | 9.9957E−03 | 1.6614E−03 |

| Surface No. | A14 | A16 | A18 | A20 |
|---|---|---|---|---|
| S1 | −7.3163E+00 | 0.0000E+00 | 0.0000E+00 | 0.0000E+00 |
| S2 | −7.3847E−01 | 0.0000E+00 | 0.0000E+00 | 0.0000E+00 |
| S3 | 4.5560E−01 | 0.0000E+00 | 0.0000E+00 | 0.0000E+00 |
| S4 | 7.7828E−01 | 0.0000E+00 | 0.0000E+00 | 0.0000E+00 |
| S5 | −9.3406E+00 | 8.1728E+00 | −2.8308E+00 | 0.0000E+00 |
| S6 | 2.5376E+00 | −8.0632E−01 | 9.2285E−02 | 0.0000E+00 |
| S7 | −2.9992E−02 | 5.6033E−03 | −5.6212E−04 | 1.6782E−05 |
| S8 | −2.1138E−03 | 7.2542E−04 | −1.2050E−04 | 8.1804E−06 |

TABLE 15

| f1 (mm) | 2.64 | f (mm) | 3.04 |
|---|---|---|---|
| f2 (mm) | -5.74 | TTL (mm) | 3.84 |
| f3 (mm) | 1.45 | ImgH (mm) | 2.40 |
| f4 (mm) | -1.30 | | |

Figure 10A:
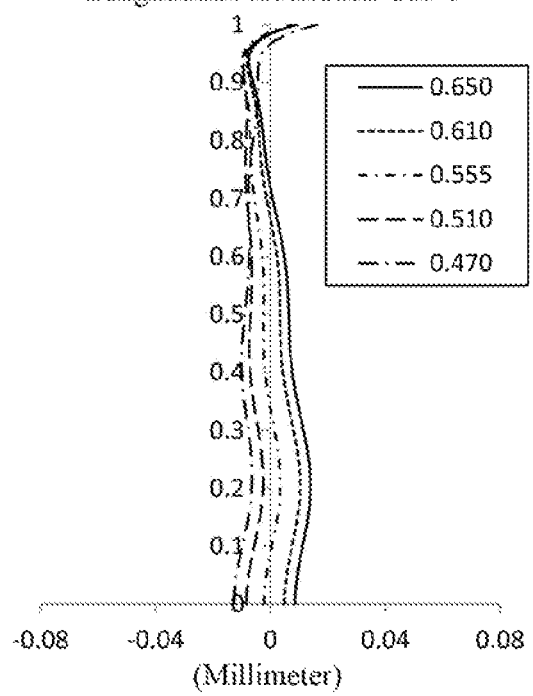
FIGS. 10A to 10D illustrate a longitudinal aberration curve, an astigmatism curve, a distortion curve and a lateral color curve of the optical imaging system of Example 5, respectively.
Figure 10B:
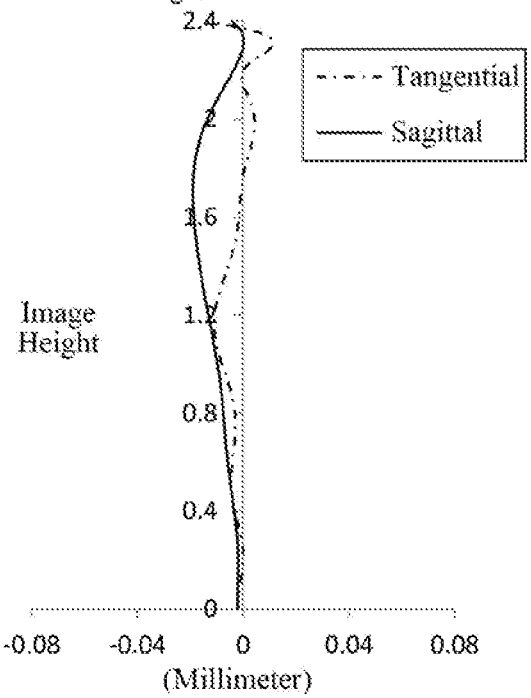
Figures 10C, 10D:
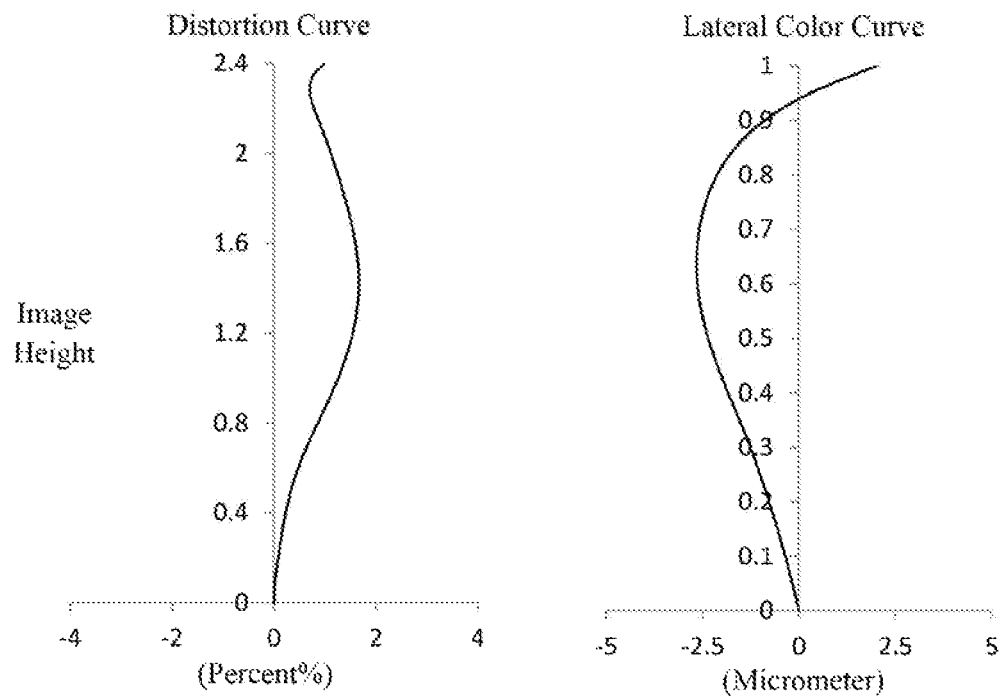

FIG. 10A illustrates a longitudinal aberration curve of the optical imaging system according to Example 5, representing deviations of focal points converged by light of different wavelengths after passing through the optical imaging system. FIG. 10B illustrates an astigmatism curve of the optical imaging system according to Example 5, representing a curvature of a tangential plane and a curvature of a sagittal plane. FIG. 10C illustrates a distortion curve of the optical imaging system according to Example 5, representing amounts of distortion corresponding to different FOVs. FIG. 10D illustrates a lateral color curve of the optical imaging system according to Example 5, representing deviations of different image heights on an image plane after light passes through the optical imaging system. It can be seen from FIG. 10A to FIG. 10D that the optical imaging system provided in Example 5 may achieve a good image quality.

Example 6

The optical imaging system according to Example 6 of the disclosure is described below with reference to FIGS. 11 to 12D.

Figure 11:
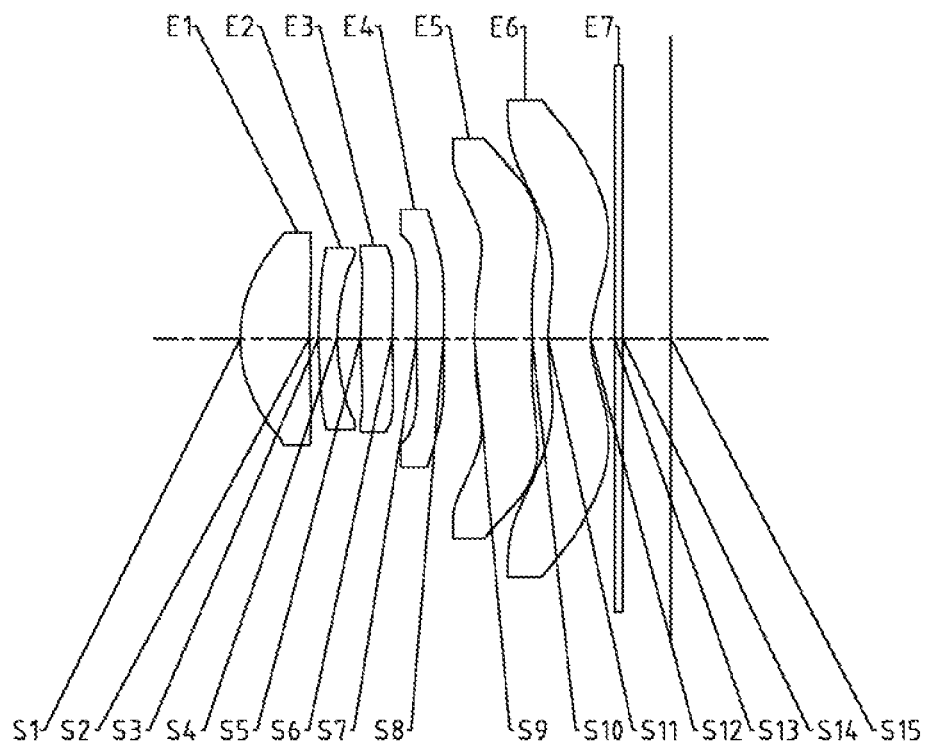
FIG. 11 is a schematic structural diagram of an optical imaging system according to Example 6 of the disclosure.

FIG. 11 shows a schematic structural diagram of an optical imaging system according to Example 6 of the disclosure. As shown in FIG. 11, the optical imaging system according to Example 6 includes six lenses E1-E6 having an object side and an image side, respectively. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10. The sixth lens E6 has an object-side surface S11 and an image-side surface S12.

In this example, the first lens E1 has a positive refractive power. The second lens E2 has a negative refractive power. The third lens E3 has a positive refractive power. The fourth lens E4 has a positive refractive power. The fifth lens E5 has a positive refractive power. The sixth lens E6 has a negative refractive power.

In the optical imaging system of this embodiment, an aperture STO is further provided between the first lens E1 and the second lens E2 for limiting the beam. The optical imaging system according to Example 6 may include a filter E7 having an object side surface S13 and an image side surface S14 that may be used for correcting a color deviation. The light from the object passes through the surfaces S1 to S14 in sequence and is finally imaged on the imaging plane S15.

Table 16 below shows the surface type, curvature radius, thickness, material, and conical coefficient of each lens of the optical imaging system of Example 6. Table 17 shows the high-order coefficients applicable each aspheric surface in Example 6. Table 18 shows the effective focal lengths f1 to f6 of the lenses of Example 6, the effective focal length f of the optical imaging system, the distance TTL between the object side surface S1 of the first lens E1 and the imaging plane S15 of the optical imaging system on the optical axis, and the half diagonal length ImgH of the effective pixel region on the electronic photosensitive element of the optical imaging system. Each aspheric surface type may be defined by formula (1) given in Example 1 above.

TABLE 16

| Surface No. | Surface Type | Curvature Radius | Thickness | Material Refractive Index | Material Abbe Number | Conical Coefficient |
|---|---|---|---|---|---|---|
| OBJ | Spherical | Infinite | Infinite | | | |
| S1 | Aspheric | 1.9703 | 0.9131 | 1.55 | 56.1 | -2.3752 |
| S2 | Aspheric | 9.5937 | 0.1200 | | | 0.0000 |
| S3 (STO) | Aspheric | 5.5063 | 0.2491 | 1.67 | 20.4 | -23.3258 |
| S4 | Aspheric | 2.9097 | 0.3057 | | | -7.7694 |
| S5 | Aspheric | 7.1676 | 0.4217 | 1.55 | 56.1 | 0.0000 |
| S6 | Aspheric | 10.1055 | 0.3211 | | | 29.1525 |
| S7 | Aspheric | 9.9832 | 0.3528 | 1.64 | 23.8 | -89.9000 |
| S8 | Aspheric | 13.7848 | 0.4195 | | | 0.0000 |
| S9 | Aspheric | 7.3565 | 0.7609 | 1.55 | 56.1 | 0.0000 |
| S10 | Aspheric | -14.0700 | 0.2133 | | | 0.0000 |
| S11 | Aspheric | 2.8720 | 0.5635 | 1.56 | 36.8 | -6.1562 |
| S12 | Aspheric | 1.3885 | 0.3139 | | | -4.9221 |
| S13 | Spherical | Infinite | 0.1100 | 1.52 | 64.2 | |
| S14 | Spherical | Infinite | 0.6353 | | | |
| S15 | Spherical | Infinite | | | | |

TABLE 17

| Surface No. | A4 | A6 | A8 | A10 | A12 |
|---|---|---|---|---|---|
| S1 | 3.5062E-02 | 2.5836E-03 | -1.0025E-02 | 1.1666E-02 | -7.5596E-03 |
| S2 | -6.2598E-02 | 6.9543E-02 | -5.1609E-02 | 2.1270E-02 | -4.7558E-03 |
| S3 | -1.0126E-01 | 1.4665E-01 | -8.0903E-02 | -1.2489E-02 | 4.9618E-02 |
| S4 | -4.1522E-02 | 1.1124E-01 | -7.3124E-02 | 2.0966E-02 | 4.5529E-03 |
| S5 | -5.2038E-02 | 4.5535E-02 | -1.0904E-01 | 1.4903E-01 | -1.3042E-01 |
| S6 | -4.2844E-02 | -2.5741E-02 | 1.0332E-01 | -1.8961E-01 | 1.6486E-01 |
| S7 | -3.6811E-02 | -7.0893E-02 | 1.3852E-01 | -1.2861E-01 | 6.3406E-02 |
| S8 | -2.7841E-02 | -9.9891E-02 | 1.3121E-01 | -8.5679E-02 | 3.2309E-02 |
| S9 | 9.5085E-02 | -1.3359E-01 | 8.4225E-02 | -4.1293E-02 | 1.4433E-02 |
| S10 | 1.2645E-01 | -7.1915E-02 | 1.6964E-02 | -1.3819E-03 | -2.8987E-04 |
| S11 | -1.4392E-01 | 6.3305E-02 | -2.1550E-02 | 5.6783E-03 | -1.0932E-03 |
| S12 | -9.7032E-02 | 4.5486E-02 | -1.8460E-02 | 5.0375E-03 | -8.8237E-04 |

| Surface No. | A14 | A16 | A18 | A20 |
|---|---|---|---|---|
| S1 | 2.4839E-03 | -3.7100E-04 | 0.0000E+00 | 0.0000E+00 |
| S2 | 3.6840E-04 | 0.0000E+00 | 0.0000E+00 | 0.0000E+00 |

TABLE 17-continued

| | | | |
|---|---|---|---|
| S3 | −2.7740E−02 | 5.2806E−03 | 0.0000E+00 | 0.0000E+00 |
| S4 | −2.5443E−03 | 0.0000E+00 | 0.0000E+00 | 0.0000E+00 |
| S5 | 6.0242E−02 | −1.1401E−02 | 0.0000E+00 | 0.0000E+00 |
| S6 | −7.3624E−02 | 1.3407E−02 | 0.0000E+00 | 0.0000E+00 |
| S7 | −1.6790E−02 | 1.7668E−03 | 0.0000E+00 | 0.0000E+00 |
| S8 | −6.5084E−03 | 5.3567E−04 | 0.0000E+00 | 0.0000E+00 |
| S9 | −3.2403E−03 | 4.3967E−04 | −3.2826E−05 | 1.0365E−06 |
| S10 | 8.6281E−05 | −8.2838E−06 | 2.8418E−07 | 0.0000E+00 |
| S11 | 1.4625E−04 | −1.2659E−05 | 6.2946E−07 | −1.3565E−08 |
| S12 | 9.9799E−05 | −7.1536E−06 | 2.9780E−07 | −5.4837E−09 |

TABLE 18

| f1 (mm) | 4.35 | f (mm) | 4.73 |
|---|---|---|---|
| f2 (mm) | −9.60 | TTL (mm) | 5.14 |
| f3 (mm) | 42.94 | ImgH (mm) | 4.08 |
| f4 (mm) | 54.43 | | |
| f5 (mm) | 8.95 | | |
| f6 (mm) | −5.57 | | |

Figure 12A:
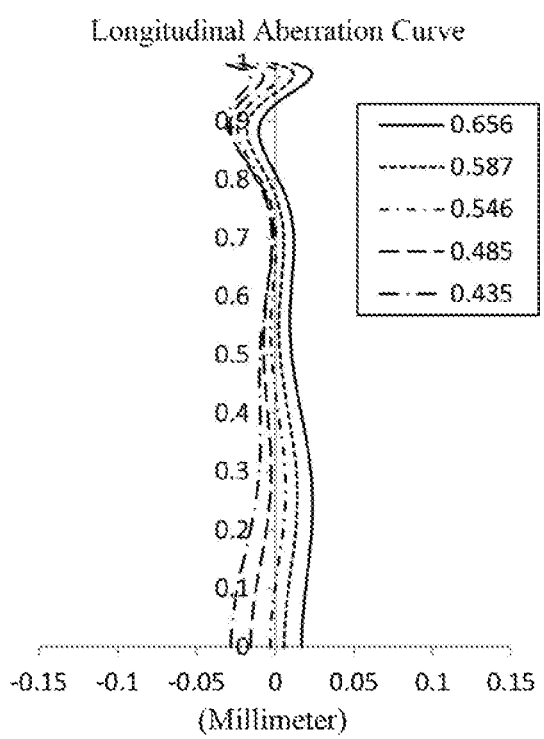
FIGS. 12A to 12D illustrate a longitudinal aberration curve, an astigmatism curve, a distortion curve and a lateral color curve of the optical imaging system of Example 6, respectively.
Figure 12B:
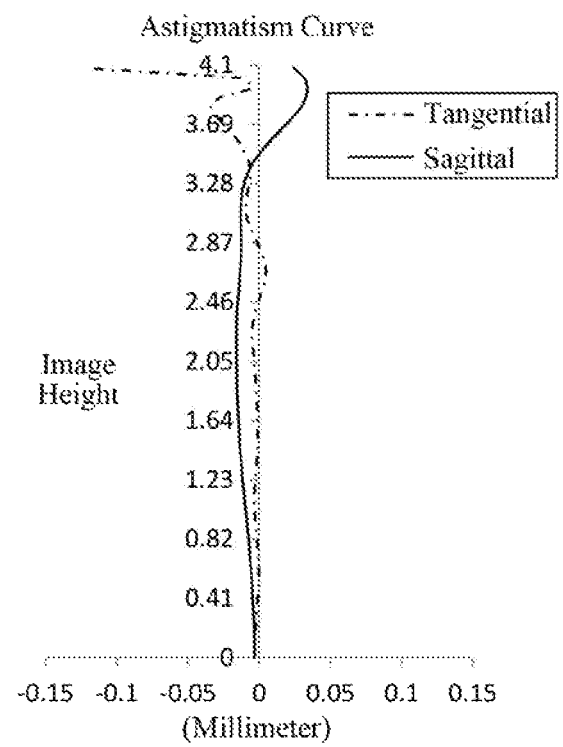
Figure 12C:
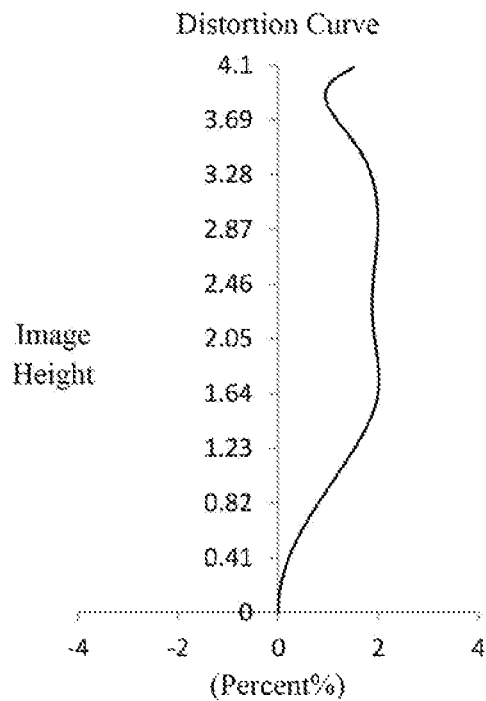
Figure 12D:
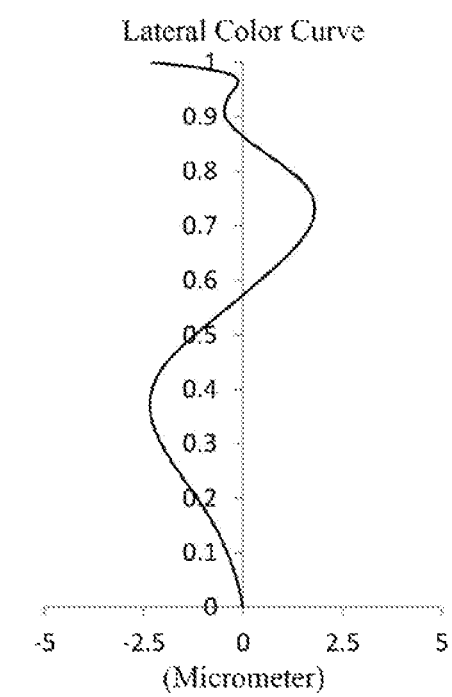

FIG. 12A illustrates a longitudinal aberration curve of the optical imaging system according to Example 6, representing deviations of focal points converged by light of different wavelengths after passing through the optical imaging system. FIG. 12B illustrates an astigmatism curve of the optical imaging system according to Example 6, representing a curvature of a tangential plane and a curvature of a sagittal plane. FIG. 12C illustrates a distortion curve of the optical imaging system according to Example 6, representing amounts of distortion corresponding to different FOVs. FIG. 12D illustrates a lateral color curve of the optical imaging system according to Example 6, representing deviations of different image heights on an image plane after light passes through the optical imaging system. It can be seen from FIG. 12A to FIG. 12D that the optical imaging system provided in Example 6 may achieve a good image quality.

Example 7

The optical imaging system according to Example 7 of the disclosure is described below with reference to FIGS. 13 to 14D.

Figure 13:
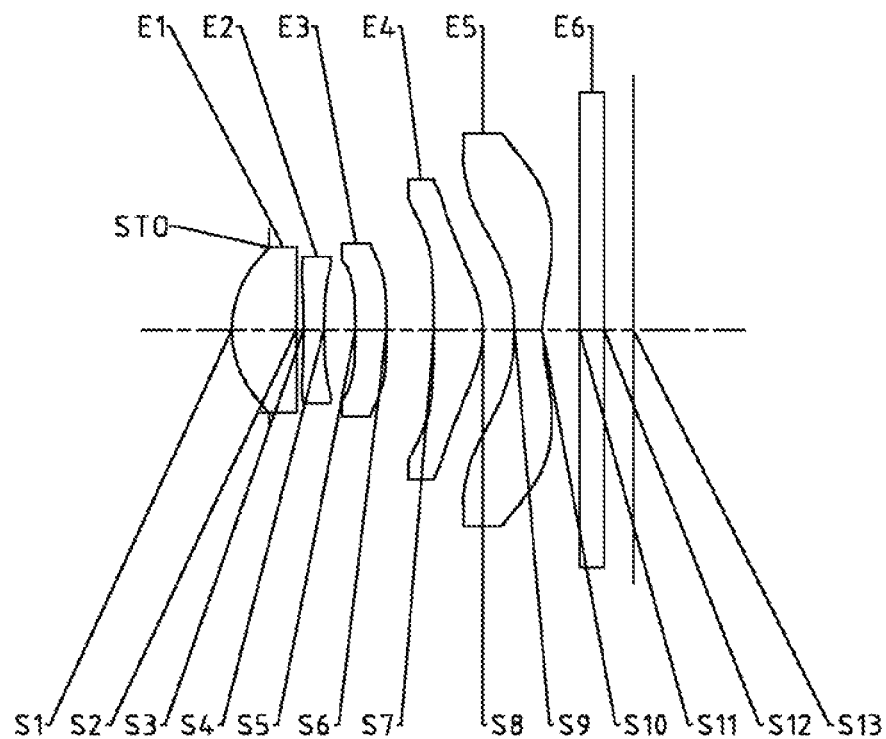
FIG. 13 is a schematic structural diagram of an optical imaging system according to Example 7 of the disclosure.

FIG. 13 shows a schematic structural diagram of an optical imaging system according to Example 7 of the disclosure. As shown in FIG. 13, the optical imaging system according to Example 7 includes five lenses E1-E5 having an object side surface and an image side surface, respectively. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10.

In this example, the first lens E1 has a positive refractive power. The second lens E2 has a negative refractive power. The third lens E3 has a positive refractive power. The fourth lens E4 has a positive refractive power. The fifth lens E5 has a negative refractive power.

In the optical imaging system of the example, an aperture STO is further provided between the object side and the first lens E1 for limiting the beam. The optical imaging system according to Example 7 may include a filter E6 having an object side surface S11 and an image side surface S12 that may be used for correcting a color deviation. The light from the object passes through the surfaces S1 to S12 in sequence and is finally imaged on the imaging plane S13.

The following Table 19 shows the surface type, curvature radius, thickness, material, and conical coefficient of each lens of the optical imaging system of Example 7. Table 20 shows the high-order coefficients applicable to each aspheric surface in Example 7. Table 21 shows the effective focal lengths f1 to f5 of the lenses of Example 7, the effective focal length f of the optical imaging system, the distance TTL between the object side surface S1 of the first lens E1 and the imaging plane S13 of the optical imaging system on the optical axis, and the half diagonal length ImgH of the effective pixel region on the electronic photosensitive element of the optical imaging system. Each aspheric surface type may be defined by formula (1) given in Example 1 above.

TABLE 19

| Surface No. | Surface Type | Curvature Radius | Thickness | Material Refractive Index | Material Abbe Number | Conical Coefficient |
|---|---|---|---|---|---|---|
| OBJ | Spherical | Infinite | Infinite | | | |
| STO | Spherical | Infinite | −0.4435 | | | |
| S1 | Aspheric | 1.5541 | 0.7870 | 1.55 | 56.1 | −0.9399 |
| S2 | Aspheric | 12.6542 | 0.0891 | | | 34.1798 |
| S3 | Aspheric | −14.6053 | 0.2439 | 1.67 | 20.4 | 54.5857 |
| S4 | Aspheric | 6.5104 | 0.3835 | | | −99.0000 |
| S5 | Aspheric | −124.6795 | 0.3773 | 1.68 | 31.4 | −99.0000 |
| S6 | Aspheric | −84.3354 | 0.5776 | | | 99.0000 |
| S7 | Aspheric | −24.6158 | 0.6080 | 1.55 | 56.1 | 99.0000 |
| S8 | Aspheric | −1.4610 | 0.3806 | | | −4.2391 |
| S9 | Aspheric | −3.9367 | 0.3350 | 1.57 | 43 | −9.1558 |
| S10 | Aspheric | 1.8468 | 0.4566 | | | −11.1349 |
| S11 | Spherical | Infinite | 0.3000 | 1.52 | 64.2 | |
| S12 | Spherical | Infinite | 0.3550 | | | |
| S13 | Spherical | Infinite | | | | |

TABLE 20

| Surface No. | A4 | A6 | A8 | A10 | A12 |
|---|---|---|---|---|---|
| S1 | 2.4067E−02 | 6.5314E−02 | −2.3773E−01 | 6.1700E−01 | −1.0249E+00 |
| S2 | −6.9770E−02 | 2.5891E−02 | 4.0836E−01 | −1.7475E+00 | 4.0287E+00 |
| S3 | −8.9141E−02 | 2.8539E−01 | −3.3757E−01 | 3.7903E−01 | −6.4517E−01 |
| S4 | 1.6589E−02 | −1.0201E−01 | 2.1387E+00 | −1.0877E+01 | 3.1392E+01 |

TABLE 20-continued

| | | | | |
|---|---|---|---|---|
| S5 | −2.0599E−01 | 3.0602E−01 | −2.5332E+00 | 1.1867E+01 | −3.4153E+01 |
| S6 | −1.4345E−01 | 5.5452E−03 | 5.6858E−02 | −3.5724E−01 | 9.6340E−01 |
| S7 | −5.0858E−03 | −1.1638E−02 | −1.4137E−02 | 3.1278E−02 | −4.0568E−02 |
| S8 | 1.1653E−02 | −3.6481E−02 | 7.5923E−02 | −7.6015E−02 | 4.3627E−02 |
| S9 | −1.3384E−01 | 7.5993E−02 | −1.9341E−02 | −2.2088E−03 | 4.0403E−03 |
| S10 | −1.0948E−01 | 6.9270E−02 | −3.3707E−02 | 1.1068E−02 | −2.3643E−03 |

| Surface No. | A14 | A16 | A18 | A20 |
|---|---|---|---|---|
| S1 | 1.1017E+00 | −7.4869E−01 | 2.9407E−01 | −5.1830E−02 |
| S2 | −5.7947E+00 | 5.0738E+00 | −2.4679E+00 | 5.0856E−01 |
| S3 | 1.1339E+00 | −1.3203E+00 | 8.5647E−01 | −2.3658E−01 |
| S4 | −5.5226E+01 | 5.8271E+01 | −3.3745E+01 | 8.2136E+00 |
| S5 | 6.0856E+01 | −6.5700E+01 | 3.9458E+01 | −1.0129E+01 |
| S6 | −1.3934E+00 | 1.1377E+00 | −4.8548E−01 | 8.4664E−02 |
| S7 | 3.0044E−02 | −1.1973E−02 | 2.4170E−03 | −1.9442E−04 |
| S8 | −1.4550E−02 | 2.7256E−03 | −2.5988E−04 | 9.4220E−06 |
| S9 | −1.4807E−03 | 2.6247E−04 | −2.3218E−05 | 8.2127E−07 |
| S10 | 2.9613E−04 | −1.6330E−05 | −2.3396E−07 | 4.6822E−08 |

TABLE 21

| | | | |
|---|---|---|---|
| f1 (mm) | 3.17 | f (mm) | 4.18 |
| f2 (mm) | −6.73 | TTL (mm) | 4.45 |
| f3 (mm) | 379.38 | ImgH (mm) | 3.41 |
| f4 (mm) | 2.82 | | |
| f5 (mm) | −2.15 | | |

Figure 14A:
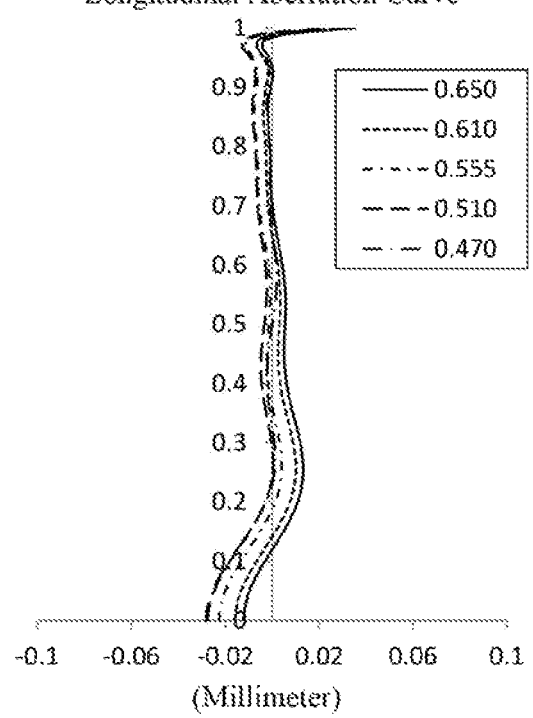
FIGS. 14A to 14D illustrate a longitudinal aberration curve, an astigmatism curve, a distortion curve and a lateral color curve of the optical imaging system of Example 7, respectively.
Figure 14B:
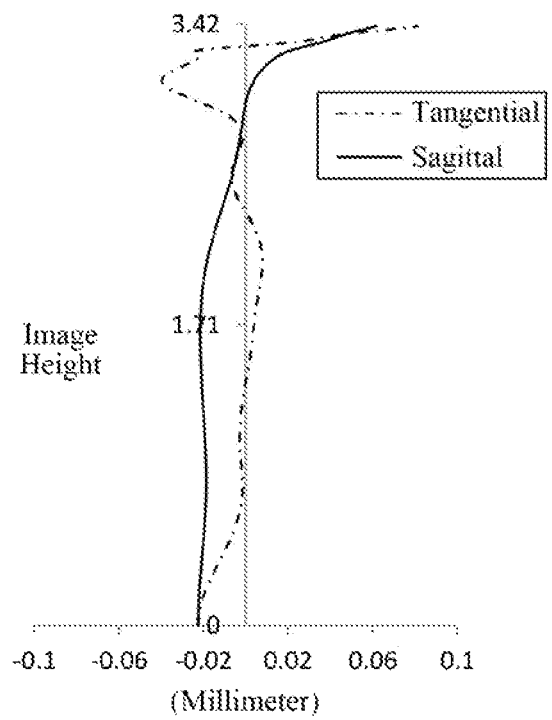
Figure 14C:
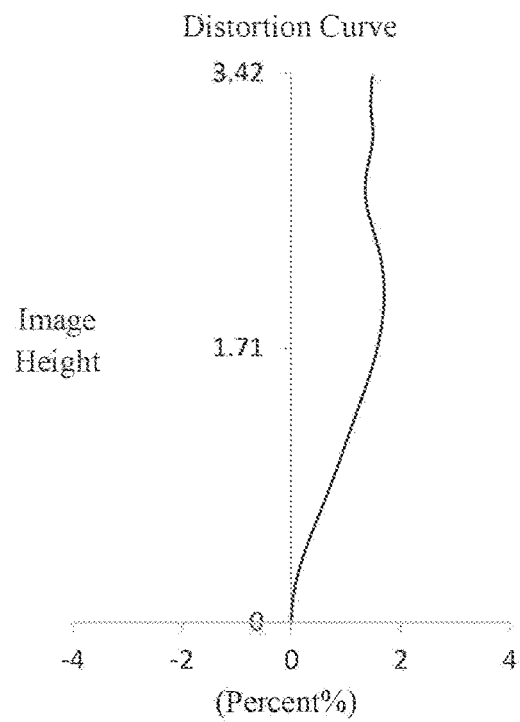
Figure 14D:
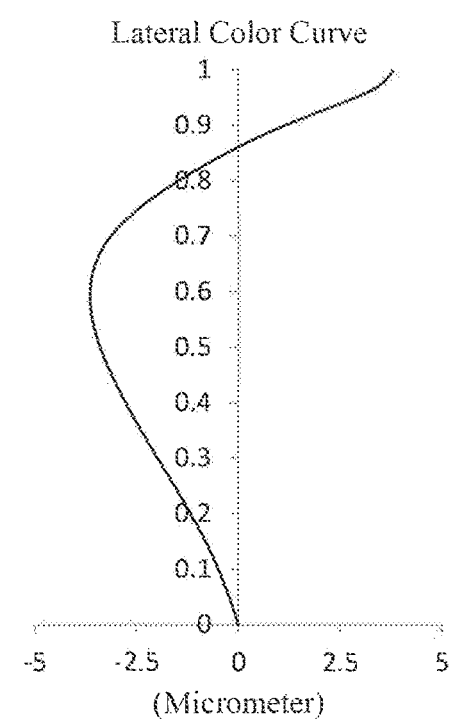

FIG. 14A illustrates a longitudinal aberration curve of the optical imaging system according to Example 7, representing deviations of focal points converged by light of different wavelengths after passing through the optical imaging system. FIG. 14B illustrates an astigmatism curve of the optical imaging system according to Example 7, representing a curvature of a tangential plane and a curvature of a sagittal plane. FIG. 14C illustrates a distortion curve of the optical imaging system according to Example 7, representing amounts of distortion corresponding to different FOVs. FIG. 14D illustrates a lateral color curve of the optical imaging system according to Example 7, representing deviations of different image heights on an image plane after light passes through the optical imaging system. It can be seen from FIG. 14A to FIG. 14D that the optical imaging system provided in Example 7 may achieve a good image quality.

In conclusion, Examples 1 to 7 respectively satisfy the relationship shown in Table 22 below.

TABLE 22

| Condition expression | Example | | | | | | |
|---|---|---|---|---|---|---|---|
| | 1 | 2 | 3 | 4 | 5 | 6 | 7 |
| $R_{n-1}/f$ | 0.76 | 0.49 | −0.95 | −0.46 | 48.05 | 0.61 | −0.94 |
| $|Vn/(f1/fn)|/10$ | 4.68 | 5.45 | 1.97 | 3.00 | 1.91 | 4.71 | 2.92 |
| F23/fn | 2.75 | −0.29 | 4.70 | 3.25 | −1.20 | 1.36 | 3.20 |
| $ImgH/DT_{n1}$ | 1.39 | 1.33 | 1.54 | 1.35 | 1.43 | 1.34 | 1.41 |
| $fn_{-1}/R_{n-1}$ | 0.82 | −2.23 | 0.27 | 0.04 | −0.34 | 1.22 | −0.11 |
| (R1 + R4)/(R1 − R4) | −3.23 | 2.11 | −2.68 | −2.40 | −1.57 | −5.19 | −1.63 |
| ΣCT/ΣAT | 2.48 | 3.14 | 2.18 | 1.48 | 3.05 | 2.36 | 1.64 |
| SAG11/CT1 | 0.64 | 0.28 | 0.53 | 0.61 | 0.25 | 0.64 | 0.58 |
| θn(°) | 11.6 | 8.0 | 5.5 | 9.9 | 7.8 | 11.1 | 4.8 |
| F2/f | −2.76 | 1.41 | −1.95 | −2.22 | −1.89 | −2.03 | −1.61 |

The foregoing is only a description of the preferred examples of the disclosure and the applied technical principles. It should be appreciated by those skilled in the art that the scope of the invention involved in the disclosure is not limited to the technical solutions formed by the particular combinations of the above technical features. The scope of the invention should also cover other technical solutions obtained by any combinations of the above technical features or equivalent features thereof without departing from the concept of the invention, such as, technical solutions formed by replacing the features as disclosed in the disclosure with (but not limited to), technical features with similar functions.

What is claimed is:

1. An optical imaging system including a first lens, a second lens, a third lens, and a plurality of subsequent lenses with refractive power and disposed sequentially along an optical axis from an object side to an image side,
   wherein the first to third lenses have +−+ refractive powers, an object side surface of the first lens is convex, and an image side surface of the second lens is concave,
   wherein a lens adjacent to an object side of a lens closest to an imaging plane has a positive refractive power,
   wherein the lens closest to the imaging plane has a negative refractive power, and an object side surface and an image side surface of the lens closest to the imaging plane are aspheric,
   wherein the total number of lenses is no greater than six,
   wherein a combined focal length f23 of the second lens and the third lens and an effective focal length fn of the lens closest to the imaging plane satisfy: −1.5<f23/fn<5, and wherein a half diagonal length ImgH of an effective pixel region on the imaging plane and an effective half-aperture DTn1 of the object-side surface of the lens closest to the imaging plane satisfy: 1<ImgH/DTn1<1.6,
   wherein f1≤4.35 mm and 3.04 mm≤f≤4.73 mm where f1 is an effective focal length of the first lens, and f is an effective foal length of the optical imaging system.

2. The optical imaging system according to claim 1, wherein −1≤$R_{n-1}$/f<50, where f is an effective focal length of the optical imaging system, and $R_{n-1}$ is a curvature radius of an object-side surface of the lens adjacent to the object side of the lens closest to the imaging plane.

3. The optical imaging system according to claim 1, wherein −2.5<$f_{n-1}$/$R_{n-1}$<1.5, where $f_{n-1}$ is an effective focal length of the lens adjacent to the object side of the lens closest to the imaging plane, and $R_{n-1}$ is a curvature radius of an object-side surface of the lens adjacent to the object side of the lens closest to the imaging plane.

4. The optical imaging system according to claim 1, wherein a curvature radius R1 of an object-side surface of the first lens and a curvature radius R4 of an image-side surface of the second lens satisfy: $-5.5<(R1+R4)/(R1-R4)<2.5$.

5. The optical imaging system according to claim 1, wherein $1<\Sigma CT/\Sigma AT<3.5$, where $\Sigma CT$ is a sum of central thicknesses on the optical axis of all lenses having refractive power, and $\Sigma AT$ is a sum of space intervals on the optical axis between any two adjacent lenses having the refractive power among the first lens to the lens closest to the imaging plane.

6. The optical imaging system according to claim 1, wherein a distance SAG11 on the optical axis from an intersection of an object-side surface of the first lens and the optical axis to a vertex of an effective radius of the object-side surface of the first lens and a central thickness CT1 of the first lens satisfy: $0<SAG11/CT1<0.7$.

7. The optical imaging system according to claim 1, an incidence angle θn of an edge light of a maximum field of view at the image-side surface of the lens closest to the imaging plane, satisfies: $4°<θn<12°$.

8. The optical imaging system according to claim 1, wherein $36≤Vn≤46$ and $1.5≤|Vn/(f1/fn)|/10≤5.5$, where Vn is an Abbe number of the lens closest to the imaging plane, fn is an effective focal length of the lens closest to the imaging plane.

9. The optical imaging system according to claim 1, wherein the total number of lenses included in the optical imaging system is four or six.

10. An optical imaging system including a first lens, a second lens, a third lens, and a plurality of subsequent lenses with refractive power and disposed sequentially along an optical axis from an object side to an image side, wherein the first to third lenses have +−+ refractive powers, an object side surface of the first lens is convex, and an image side surface of the second lens is concave, wherein a lens adjacent to an object side of a lens closest to an imaging plane has a positive refractive power, wherein the lens closest to the imaging plane has a negative refractive power, and an object-side surface and an image-side surface of the lens closest to the imaging plane are aspheric, wherein the total number of lenses is no greater than six, wherein an effective focal length f of the optical imaging system and an effective focal length f2 of the second lens satisfy: $-3<f2/f<1.5$, and wherein a half diagonal length ImgH of an effective pixel region on the imaging plane and an effective half-aperture DTn1 of the object-side surface of the lens closest to the imaging plane satisfy: $1<ImgH/DTn1<1.6$, wherein $f1≤3.17$ mm and $3.04$ mm$≤f≤4.73$ mm, where f1 is an effective focal length of the first lens.

11. The optical imaging system according to claim 10, wherein $-1≤R_{n-1}/f<50$, where f is the effective focal length of the optical imaging system, and $R_{n-1}$ is a curvature radius of an object-side surface of the lens adjacent to the object side of the lens closest to the imaging plane.

12. The optical imaging system according to claim 10, wherein $-2.5<f_{n-1}/R_{n-1}<1.5$, where $f_{n-1}$ is an effective focal length of the lens adjacent to the object side of the lens closest to the imaging plane, and $R_{n-1}$ is a curvature radius of an object-side surface of the lens adjacent to the object side of the lens closest to the imaging plane.

13. The optical imaging system according to claim 10, wherein a curvature radius R1 of an object-side surface of the first lens and a curvature radius R4 of an image-side surface of the second lens satisfy: $-5.5<(R1+R4)/(R1-R4)<2.5$.

14. The optical imaging system according to claim 10, wherein $1<\Sigma CT/\Sigma AT<3.5$, where $\Sigma CT$ is a sum of central thicknesses on the optical axis of all lenses having refractive power, and $\Sigma AT$ is a sum of space intervals on the optical axis between any two adjacent lenses having refractive power among the first lens to the lens closest to the imaging plane.

15. The optical imaging system according to claim 10, wherein a distance SAG11 on the optical axis from an intersection of an object-side surface of the first lens and the optical axis to a vertex of an effective radius of the object-side surface of the first lens and a central thickness CT1 of the first lens satisfy: $0<SAG11/CT1<0.7$.

16. The optical imaging system according to claim 10, wherein an incidence angle θn of an edge light of a maximum field of view at the image-side surface of the lens closest to the imaging plane, satisfies: $4°<θn<12°$.

* * * * *